United States Patent
Wang et al.

(10) Patent No.: US 12,309,059 B2
(45) Date of Patent: May 20, 2025

(54) MULTIPATH AGGREGATION SCHEDULING METHOD AND ELECTRONIC DEVICE

(71) Applicant: HUAWEI TECHNOLOGIES CO., LTD., Guangdong (CN)

(72) Inventors: Hao Wang, Shenzhen (CN); Zhijun Zhang, Shenzhen (CN); Feng Li, Shenzhen (CN); Xingmin Guo, Shanghai (CN); Songping Yao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 22 days.

(21) Appl. No.: 18/548,907

(22) PCT Filed: Mar. 4, 2022

(86) PCT No.: PCT/CN2022/079181
§ 371 (c)(1),
(2) Date: Sep. 4, 2023

(87) PCT Pub. No.: WO2022/184157
PCT Pub. Date: Sep. 9, 2022

(65) Prior Publication Data
US 2024/0163204 A1    May 16, 2024

(30) Foreign Application Priority Data

Mar. 4, 2021  (CN) .......................... 202110241645.4
May 31, 2021  (CN) .......................... 202110603312.1
Jul. 30, 2021  (CN) .......................... 202110870615.X

(51) Int. Cl.
*G06F 15/173*    (2006.01)
*H04L 45/122*    (2022.01)
*H04L 45/24*    (2022.01)
*H04L 45/243*    (2022.01)

(52) U.S. Cl.
CPC .......... *H04L 45/245* (2013.01); *H04L 45/122* (2013.01); *H04L 45/243* (2022.05)

(58) Field of Classification Search
CPC ... H04L 45/245; H04L 45/122; H04L 45/243; H04L 1/1854; H04L 69/14; H04L 47/193; H04L 2001/0097; H04L 47/34; H04L 45/24
See application file for complete search history.

(56) References Cited

U.S. PATENT DOCUMENTS

| | | | |
|---|---|---|---|
| 10,541,932 B2* | 1/2020 | Saavedra | H04L 47/56 |
| 2003/0012200 A1* | 1/2003 | Salamat | H04L 47/34 370/400 |
| 2021/0399980 A1* | 12/2021 | Higo | H04L 45/22 |

FOREIGN PATENT DOCUMENTS

| | | |
|---|---|---|
| CN | 106850426 A | 6/2017 |
| CN | 110429963 A | 11/2019 |
| GB | 2543840 A | 5/2017 |
| JP | 2015097349 A | 5/2015 |

* cited by examiner

Primary Examiner — John B Walsh

(57) ABSTRACT

A multipath aggregation scheduling method and an electronic device provide for configuring transmission sequences of network packets on different paths when there are a plurality of paths between a client and a service end. This enables a network packet sent later on any of the plurality of paths to be sent first on at least one other path, thereby increasing transmission rate of the network.

16 Claims, 24 Drawing Sheets

Path 1: (IP1, 80, IP3, 1314)
Path 2: (IP2, 80, IP3, 1314)

Path 1: Connection provided by a router

Path 2: Connection provided by Bluetooth

| Sub-data block 1 | Sub-data block 2 | Sub-data block 3 |
|---|---|---|
| Sub-data block 3 | Sub-data block 1 | Sub-data block 2 |
| Sub-data block 2 | Sub-data block 3 | Sub-data block 1 |

FIG. 13A

| | | |
|---|---|---|
| MSG1<br>MSG2 | MSG3<br>MSG4<br>MSG5 | MSG6<br>MSG7<br>MSG8 |
| MSG8<br>MSG7<br>MSG6 | MSG2<br>MSG1 | MSG3<br>MSG4<br>MSG5 |
| MSG5<br>MSG4<br>MSG3 | MSG7<br>MSG6<br>MSG8 | MSG2<br>MSG1 |

FIG. 13B

MULTIPATH AGGREGATION SCHEDULING METHOD AND ELECTRONIC DEVICE

CROSS-REFERENCE TO RELATED APPLICATIONS

This application is a National Stage of International Application No. PCT/CN2022/079181 filed on Mar. 4, 2022, which claims priority to Chinese Patent Application No. 202110241645.4 filed on Mar. 4, 2021, and Chinese Patent Application No. 202110603312.1 filed on May 31, 2021, and Chinese Patent Application No. 202110870615.X filed on Jul. 30, 2021. All of the aforementioned applications are hereby incorporated by reference in their entireties.

TECHNICAL FIELD

This application relates to the field of electronic technologies, and in particular, to a multipath aggregation scheduling method and an electronic device.

BACKGROUND

With the development of communication technologies and the popularization of smart devices, an artificial intelligence & internet of things (artificial intelligence & Internet of Things, AIoT) era of internet of everything is coming. Benefiting from improved distributed interconnection capabilities of operating systems, devices such as smart wearable devices, smart home devices, and mobile terminals may perform data interaction through a network, and implement specific functions through collaboration based on the data interaction.

Electronic devices such as smart wearable devices, smart home devices, and mobile terminals already can implement data interaction through a wireless network. However, compared with a requirement of a plurality of electronic devices for communication resources, communication resources that can be used in space are limited. For example, when a plurality of devices access a wireless network provided by a same access device, the plurality of devices need to contend for limited wireless air interface resources for data interaction. After an electronic device fails in contending for the wireless air interface resources, the electronic device temporarily stores to-be-sent data locally, and waits for a next contention.

To ensure that data generated by a client can be sent to a service end in time, a feasible solution is as follows: When a protocol stack of the client supports a multipath transmission control protocol (multipath transmission control protocol, MPTCP), a service on the client may transmit the data to the service end over a plurality of paths. In this case, when a congestion probability of a path is $P_a$, a probability of congestion during data sending is $P_a^{M1}$ if the service on the client sends identical data to the service end over M mutually independent paths. This greatly reduces impact caused by congestion of a single path.

Although a multipath transmission protocol represented by the MPTCP uses a plurality of paths to improve transmission robustness and reduce a probability of data congestion, a data transmission rate is not increased by using the plurality of paths, and resources of the plurality of paths are not fully utilized.

SUMMARY

Embodiments of this application provide a multipath aggregation scheduling method. The method includes: A protocol stack on a client allocates network packets to different paths based on a specific order, so that a network packet sent later on a path may be sent first on another path, thereby increasing a transmission rate of the network packet.

According to a first aspect, this application provides a multipath aggregation scheduling method, and the method includes: determining that there are N paths between a client and a service end, where the N paths include a first path and a second path, and N is an integer greater than or equal to 2; sending, by the client, M network packets on the first path in a first order, where M is an integer greater than or equal to 2; and sending, by the client, the M network packets on the second path in a second order, where the first order is different from the second order.

In the foregoing embodiment, the client may send a plurality of same network packets on different paths in different orders, and there needs to be at least one network packet which reaches the service end preferentially on the second path, thereby improving a transmission rate of the network packet. Second, because the transmission orders of the network packets on different paths are different, from a statistical point of view, an average transmission rate of the M network packets is improved.

With reference to some embodiments of the first aspect, in some embodiments, the method further includes: determining that the N paths further include a third path; and sending, by the client, the M network packets on the third path in a third order, where the third order is different from the first order, and the third order is different from the second order.

In the foregoing embodiment, there may be a plurality of paths between the client and the service end, and is not limited to two paths or three paths. Transmission orders of network packets on different paths are different. Therefore, there needs to be at least one network packet preferentially reaches the service end on one of the plurality of paths. In this way, a transmission rate of the network packet is improved. Second, because the transmission orders of the network packets on different paths are different from each other, from a statistical point of view, an average transmission rate of the M network packets is improved.

With reference to some embodiments of the first aspect, in some embodiments, a distance between the first order and the second order is the largest.

In the foregoing embodiment, because the distance between the first order and the second order is the largest, a network packet sent later on the first path is sent earlier on the second path, and a network packet sent earlier on the first path is sent later on the second path, so that an average transmission rate of a plurality of network packets is equal to a sum of transmission rates of the two paths.

With reference to some embodiments of the first aspect, in some embodiments, a cross-correlation between the first order and the second order is the smallest.

In the foregoing embodiment, because the cross-correlation between the first order and the second order is the smallest, a network packet sent later on the first path is sent earlier on the second path, and a network packet sent earlier on the first path is sent later on the second path, so that an average transmission rate of a plurality of network packets is equal to a sum of transmission rates of the two paths.

With reference to some embodiments of the first aspect, in some embodiments, a sum of distances between every two of the first order, the second order, and the third order is the largest.

In the foregoing embodiment, because the sum of distances between every two of sending orders of network packets on different paths is the largest, an average transmission rate of a plurality of network packets is equal to a sum of transmission rates of the plurality of paths.

With reference to some embodiments of the first aspect, in some embodiments, a sum of cross-correlations between every two of the first order, the second order, and the third order is the smallest.

In the foregoing embodiment, because a sum of cross-correlations between every two of sending orders of network packets on different paths is the smallest, an average transmission rate of a plurality of network packets is equal to a sum of transmission rates of the plurality of paths.

With reference to some embodiments of the first aspect, in some embodiments, the method further includes: After receiving an acknowledgment packet, the client deletes the M network packets and stops sending the M network packets.

In the foregoing embodiment, after receiving the M network packets, the service end may send an acknowledgment packet to the client, so that the client deletes the M network packets and stops sending the M network packets, thereby reducing redundant sending of the client.

With reference to some embodiments of the first aspect, in some embodiments, the M network packets form a data block, and the data block is for implementing a specific function.

In the foregoing embodiment, a data block having a plurality of network packets may be used as a basic processing unit, so that an increased average transmission rate of the network packets can directly improve user experience.

With reference to some embodiments of the first aspect, in some embodiments, there is no repetition in the M network packets.

In the foregoing embodiment, because the multipath aggregation scheduling method is sent in a redundancy mode, robustness is high, no repeated network packet may be configured for the M network packets.

According to a second aspect, this application provides another multipath aggregation scheduling method, and the method includes: determining that there are N paths between a client and a service end, where the N paths include a first path and a second path, and N is an integer greater than or equal to 2; sending, by the client, M network packets on the first path, where the M network packets include a first network packet; and sending, by the client, the M network packets on the second path, where the first network packet is in a first half of the M network packets on the first path; and the first network packet is in a last half of the M network packets on the second path.

In the foregoing embodiment, sending orders of a plurality of network packets on different paths may not be determined for the network packet sent by the client. In a process of sending the network packet, it is ensured that at least one network packet is sent first on the first path and is sent later on the second path.

With reference to some embodiments of the second aspect, in some embodiments, the M network packets further include a second network packet, and the second network packet is in first 1/N of the M network packets on the first path; and the second network packet is in last (N−1)/N of the M network packets on the second path.

In the foregoing embodiment, when at least one network packet is in first 1/N, and a next network packet is in last (N−1)/N, for the one or more network packets, a transmission rate of the one or more network packets may be increased. Second, in a statistical sense, it helps to improve an average transmission rate of the M network packets.

With reference to some embodiments of the second aspect, in some embodiments, the M network packets further include a second network packet, and the second network packet is in first 1/N of the M network packets on the first path; and the second network packet is in last 1/N of the M network packets on the second path.

In the foregoing embodiment, when at least one network packet is in first 1/N, and a next network packet is in last 1/N, for the one or more network packets, a transmission rate may be equivalent to a transmission rate on a faster path. Second, in a statistical sense, an average transmission rate of the M network packets is equal to a sum of the two paths.

With reference to some embodiments of the second aspect, in some embodiments, the M network packets form at least one data block, and the data block is for implementing a specific function.

In the foregoing embodiment, a data block having a plurality of network packets may be used as a basic processing unit, so that an increased average transmission rate of the network packets can directly improve user experience.

With reference to some embodiments of the second aspect, in some embodiments, there is no repetition in the M network packets.

In the foregoing embodiment, because the multipath aggregation scheduling method is sent in a redundancy mode, robustness is high, no repeated network packet may be configured for the M network packets.

With reference to some embodiments of the second aspect, in some embodiments, the method further includes: After receiving an acknowledgment packet, the client deletes the M network packets and stops sending the M network packets.

After receiving the M network packets, the service end may send an acknowledgment packet to the client, so that the client deletes the M network packets and stops sending the M network packets, thereby reducing redundant sending of the client.

According to a third aspect, this application provides another multipath aggregation scheduling method, and the method includes: determining that there are N paths between a client and a service end, where the N paths include a first path and a second path, and N is an integer greater than or equal to 2; and repeatedly sending, by the client, M network packets on each of the N paths, where there is no intersection between first K network packets on the first path and first L network packets on the second path, a sum of K and L is equal to M, K is a positive integer, and L is a positive integer.

In the foregoing embodiment, the client repeatedly sends the M network packets on the two paths. When the M complete network packets can be formed between the plurality of network packets that are preferentially sent on the first path and the plurality of network packets that are previously sent on the second path, in a statistical sense, a transmission rate of the M network packets is equal to a sum of transmission rates of the two paths.

With reference to some embodiments of the third aspect, in some embodiments, the arrangement order of the first K network packets on the first path is inverse to the arrangement order of last K network packets on the second path.

In the foregoing embodiment, if an arrangement order of the network packets sent previously on the first path and an arrangement order of the network packets sent later on the second path are in a reverse order relationship, transmission rates of the M network packets are equal to a sum of transmission rates of the two paths.

With reference to some embodiments of the third aspect, in some embodiments, the method further includes: determining that the N paths further include a third path, where there is no intersection between first R network packets on the first path, first S network packets on the second path, and first T network packets on the third path, a sum of R, S, and T is equal to M, R is a positive integer, S is a positive integer, and T is a positive integer.

In the foregoing embodiment, this is not limited to two paths. In a case of a plurality of paths, in a statistical sense, an average transmission rate of the M network packets may be equal to a sum of transmission rates of the plurality of paths.

With reference to some embodiments of the third aspect, in some embodiments, the M network packets form at least one data block, and the data block is for implementing a specific function.

In the foregoing embodiment, a data block having a plurality of network packets may be used as a basic processing unit, so that an increased average transmission rate of the network packets can directly improve user experience.

With reference to some embodiments of the third aspect, in some embodiments, there is no repetition in the M network packets.

In the foregoing embodiment, because the multipath aggregation scheduling method is sent in a redundancy mode, robustness is high, no repeated network packet may be configured for the M network packets.

With reference to some embodiments of the third aspect, in some embodiments, the method further includes: After receiving an acknowledgment packet, the client deletes the M network packets and stops sending the M network packets.

After receiving the M network packets, the service end may send an acknowledgment packet to the client, so that the client deletes the M network packets and stops sending the M network packets, thereby reducing redundant sending of the client.

According to a fourth aspect, this application provides another multipath aggregation scheduling method, and the method includes: determining that there are N paths between a client and a service end, where the N paths include a first path and a second path, and N is an integer greater than or equal to 2; and before receiving an acknowledgment packet sent by the service end, sending, by the client, M network packets in a first order, and sending a second network packet in a second order; and after receiving the acknowledgment packet sent by the service end, stopping, by the client, sending the M network packets on the N paths, where the network packet is for confirming that the service end receives the M network packets.

In the foregoing embodiment, the client sends the M network packets on different paths in different orders, so that an average transmission rate of the M network packets can be improved.

With reference to some embodiments of the fourth aspect, in some embodiments, the method further includes: The N paths further include a third path; and the client sends the M network packets on the third path in a third order, where the third order is different from the first order, and the third order is different from the second order.

In the foregoing embodiment, there may be a plurality of paths between the client and the service end, and is not limited to two paths or three paths. Transmission orders of network packets on different paths are different. Therefore, there needs to be at least one network packet preferentially reaches the service end on one of the plurality of paths. In this way, a transmission rate of the network packet is improved. Second, because the transmission orders of the network packets on different paths are different from each other, from a statistical point of view, an average transmission rate of the M network packets is improved.

With reference to some embodiments of the fourth aspect, in some embodiments, a distance between the first order and the second order is the largest.

In the foregoing embodiment, because the distance between the first order and the second order is the largest, a network packet sent later on the first path is sent earlier on the second path, and a network packet sent earlier on the first path is sent later on the second path, so that an average transmission rate of a plurality of network packets is equal to a sum of transmission rates of the two paths.

With reference to some embodiments of the fourth aspect, in some embodiments, a cross-correlation between the first order and the second order is the smallest.

In the foregoing embodiment, because the cross-correlation between the first order and the second order is the smallest, a network packet sent later on the first path is sent earlier on the second path, and a network packet sent earlier on the first path is sent later on the second path, so that an average transmission rate of a plurality of network packets is equal to a sum of transmission rates of the two paths.

With reference to some embodiments of the fourth aspect, in some embodiments, a sum of distances between every two of the first order, the second order, and the third order is the largest.

In the foregoing embodiment, because the sum of distances between every two of sending orders of network packets on different paths is the largest, an average transmission rate of a plurality of network packets is equal to a sum of transmission rates of the plurality of paths.

With reference to some embodiments of the fourth aspect, in some embodiments, a sum of cross-correlations between every two of the first order, the second order, and the third order is the smallest.

In the foregoing embodiment, because a sum of cross-correlations between every two of sending orders of network packets on different paths is the smallest, an average transmission rate of a plurality of network packets is equal to a sum of transmission rates of the plurality of paths.

With reference to some embodiments of the fourth aspect, in some embodiments, the M network packets form a data block, and the data block is for implementing a specific function.

In the foregoing embodiment, a data block having a plurality of network packets may be used as a basic processing unit, so that an increased average transmission rate of the network packets can directly improve user experience.

With reference to some embodiments of the fourth aspect, in some embodiments, there is no repetition in the M network packets.

In the foregoing embodiment, because the multipath aggregation scheduling method is sent in a redundancy mode, robustness is high, no repeated network packet may be configured for the M network packets.

According to a fifth aspect, this application provides an electronic device, where the electronic device includes: one or more processors and a memory, where the memory is coupled to the one or more processors, the memory is configured to store computer program code, the computer program code includes computer instructions, and the one or more processors invoke the computer instructions, so that the electronic device is enabled to perform the method described in any one of the first aspect, the second aspect, the third aspect, and the possible implementations of the first aspect, the second aspect, and the third aspect.

According to a sixth aspect, an embodiment of this application provides a chip. The chip is applied to an electronic device, and the chip includes one or more processors. The processor is configured to invoke computer instructions, so that the electronic device is enabled to perform the method described in any one of the first aspect, the second aspect, the third aspect, and the possible implementations of the first aspect, the second aspect, and the third aspect.

According to a seventh aspect, an embodiment of this application provides a computer program product. When the computer program product runs on a computer, the computer is enabled to perform the method described in any one of the first aspect, the second aspect, the third aspect, and the possible implementations of the first aspect, the second aspect, and the third aspect.

According to an eighth aspect, an embodiment of this application provides a computer-readable storage medium. The computer-readable storage medium stores instructions. When the instructions are run on a computer, the computer is enabled to perform the method described in any one of the first aspect, the second aspect, the third aspect, and the possible implementations of the first aspect, the second aspect, and the third aspect.

It may be understood that the electronic device provided in the fifth aspect, the chip provided in the sixth aspect, the computer program product provided in the seventh aspect, and the computer storage medium provided in the eighth aspect are all configured to perform the method provided in embodiments of this application. Therefore, for beneficial effects that can be achieved by the method, refer to beneficial effects in the corresponding method. Details are not described herein again.

BRIEF DESCRIPTION OF DRAWINGS

FIG. 13A and FIG. 13B are schematic diagrams of an example of a data matrix according to an embodiment of this application;

DESCRIPTION OF EMBODIMENTS

Figure 1:
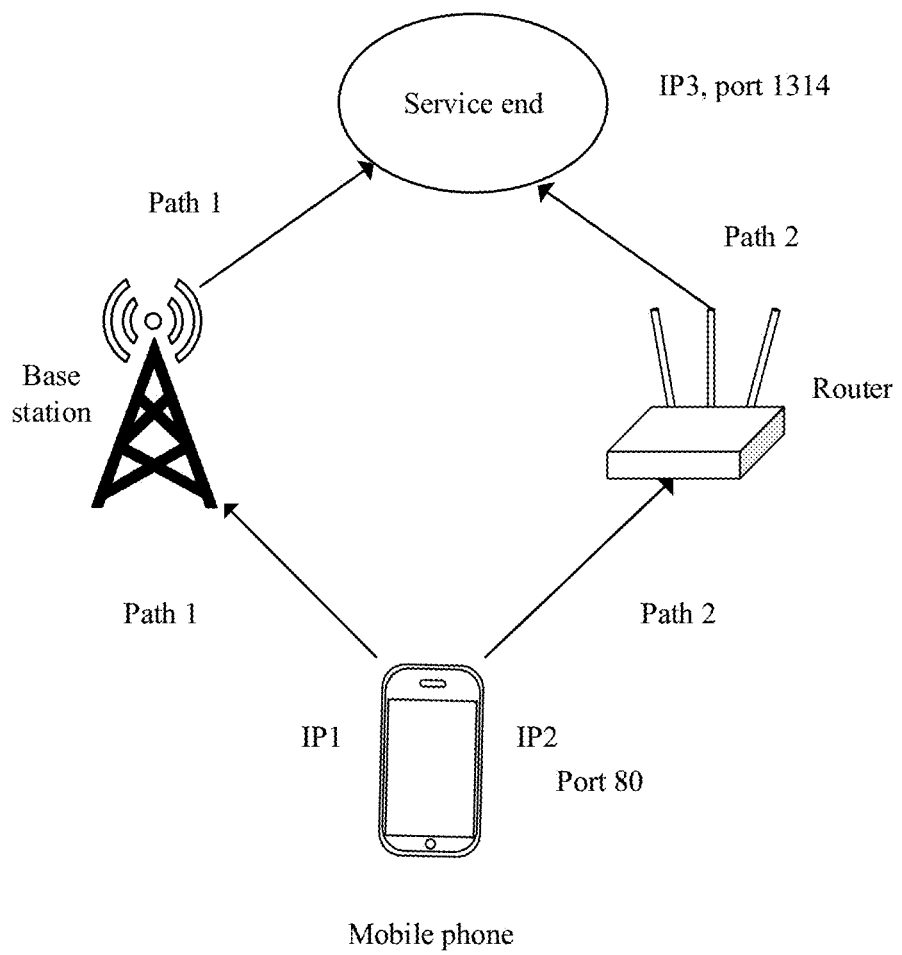
FIG. 1 is a schematic diagram of an example in which a client communicates with a service end by using a plurality of paths.

Terms used in the following embodiments of this application are merely intended to describe specific embodiments, and are not intended to limit this application. As used in this specification and the claims of this application, a singular expression form, "one", "a", "said", "foregoing", "the", or "this", is intended to also include a plural expression form, unless clearly indicated to the contrary in the context. It should be further understood that the term "and/or" used in this application indicates and includes any or all possible combinations of one or more listed items.

The following terms "first" and "second" are merely used for description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more than two.

For ease of understanding, the following first describes related terms and related concepts in embodiments of this application. Terms used in the description of embodiments of the present invention are merely used to explain specific embodiments of the present invention, but are not intended to limit the present invention.

(1) Client and Service End

The client is an endpoint that initiates connection, and the service end is an endpoint that accepts connection. Alternatively, the client is an endpoint for sending data, and the service end is an endpoint for receiving data.

The client/service end may be a terminal device, for example, a mobile phone, a tablet computer, a virtual reality terminal device, an augmented reality terminal device, a wireless terminal in industrial control, a wireless terminal in driverless driving, a wireless terminal in telemedicine, a wireless terminal in a smart grid, a wireless terminal in transportation security, a wireless terminal in smart cities, a wireless terminal in smart homes, a wearable device, and a vehicle-mounted device.

The service end may serve the client, the service end may provide a resource for the client and store client data, and the service end may also be referred to as a server.

The connection is a state shared between the client and the service end. Data flow over the connection may be bidirectional or unidirectional.

(2) Multipath (Path) Transmission Protocol

When a protocol stack on the client supports the multipath transmission protocol, data may be transmitted to the service end through a plurality of paths, thereby improving transmission performance between the client and the service end, for example, reducing a delay and increasing a throughput rate.

The multipath transmission protocol may include an MPTCP protocol, a multipath quick udp internet connection (multipath quick udp internet connection, MPQUIC) protocol, and the like.

A path may have a plurality of identifiers. For example, a path four-tuple may be used as an identifier to distinguish different paths, or a path ID may be used as an identifier to distinguish different paths. This is not limited herein. A form of the path four-tuple is [source IP, port, target IP, port].

The following uses content shown in FIG. 1 as an example to describe a process in which a client communicates with a service end by using a plurality of paths.

FIG. 1 is a schematic diagram of an example in which a client communicates with a service end by using a plurality of paths.

As shown in FIG. 1, the client may be a mobile terminal, for example, a mobile phone. The mobile phone communicates with the service end through a base station and a router at the same time. For example, an IP address allocated by the base station to the mobile phone is IP1, an IP address allocated by the router to the mobile phone is IP2, and a source port on the mobile phone is 80. An IP address of the service end is IP3, and a target port of the service end is 1314. In this case, the mobile phone may use a first physical path: (IP1, 80, IP3, 1314) and a second physical path: (IP2, 80, IP3, 1314) to communicate with the service end.

In the content shown in FIG. 1, the mobile phone may simultaneously enable a cellular mobile communication function (5G and/or 4G) and a Wi-Fi function to implement multipath transmission.

In another case, if the client has a dual-cellular mobile communication capability, the client separately obtains different source IPs by using a 4G base station and a 5G base station, to implement multipath transmission.

In another case, if the client has a dual Wi-Fi capability, the client may simultaneously access different frequency bands of a same router or different frequency bands of different routers. For example, the client simultaneously accesses a 2.4G frequency band and a 5G frequency band of the router, so as to implement multipath transmission. Alternatively, the client accesses the 2.4G frequency band of a router A and the 5G frequency band of a router B at the same time, to implement multipath transmission. Alternatively, the client accesses a 5G high frequency band and a 5G low frequency band of the router at the same time, to implement multipath transmission. Alternatively, the client accesses the 5G high frequency band of the router A and the 5G low frequency band of the router B at the same time, to implement multipath transmission.

It should be noted that, the client and the service end may establish a plurality of paths, not limited to two paths. For example, the client has a dual-cell mobile communication capability and a dual Wi-Fi capability, and the mobile phone accesses a 2.4G frequency band and a 5G frequency band of a 4G base station, a 5G base station, and a router at the same time, thereby implementing four-path transmission.

In a near-field scenario, for example, in a peer-to-peer (peer to peer, P2P) scenario, the client may further use a near-field communication service to perform data interaction. The near-field communication service may include: Bluetooth, Apple Wireless Direct Link (Apple Wireless Direct Link, AWDL), HiLink, ZigBee, and the like.

Figure 2:
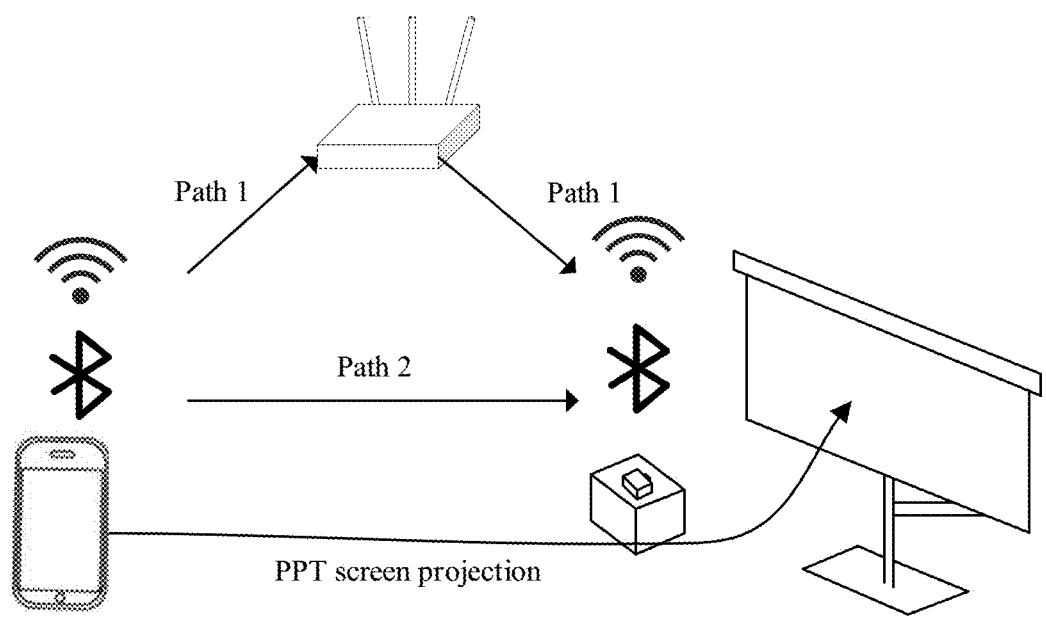
FIG. 2 is a schematic diagram of an example of a multipath communication scenario according to this application.

The following uses content shown in FIG. 2 as an example to describe a process in which a client communicates with a service end by using a plurality of paths in a P2P scenario.

FIG. 2 is a schematic diagram of an example of a multipath communication scenario according to this application.

As shown in FIG. 2, a mobile phone separately establishes a connection to a projector by using Bluetooth and a router. A path 1 is based on a connection provided by the router, a data flow direction on the path 1 may be that the mobile phone sends data to the router, and the router forwards the data to the projector. A path 2 is based on a Bluetooth connection, and a data flow direction on the path 2 may be that the mobile phone sends data to the projector.

It should be noted that, for a TCP protocol and another protocol based on the TCP protocol, one connection may carry at least one path. For a UDP protocol, and other protocols based on the UDP protocol, such as a quick udp internet connection (quick udp internet connection, QUIC) protocol, a path may be determined by using a connection or a unidirectional flow.

(3) Wireless Channel

A wireless channel is a channel that uses a wireless signal as a transmission carrier and is configured to transmit data. A frequency and a bandwidth may be used to describe a wireless channel, and the frequency and the bandwidth jointly determine a frequency range of a signal transmitted on the channel. In a P2P scenario, a wireless channel can use the following frequency bands: an industrial scientific and medical (ISM) frequency band and an unlicensed frequency band.

The communication performance of the wireless channel may include a channel delay, a communication rate, and the like. The channel delay is a time required by the wireless channel to transmit data from one end to the other end. The communication rate is a quantity of information bits correctly transmitted per unit time on the wireless channel.

In an open system interconnection (Open System Interconnection, OSI) model, the wireless channel is located at a physical layer. The OSI model may be divided into an application layer, a presentation layer, a session layer, a transmission layer, a network layer, a data link layer, and a physical layer from top to bottom.

It should be noted that communication performance of the wireless channel is time-varying, that is, communication performance of the wireless channel in a future time period or at a moment cannot be accurately determined.

Figure 3:
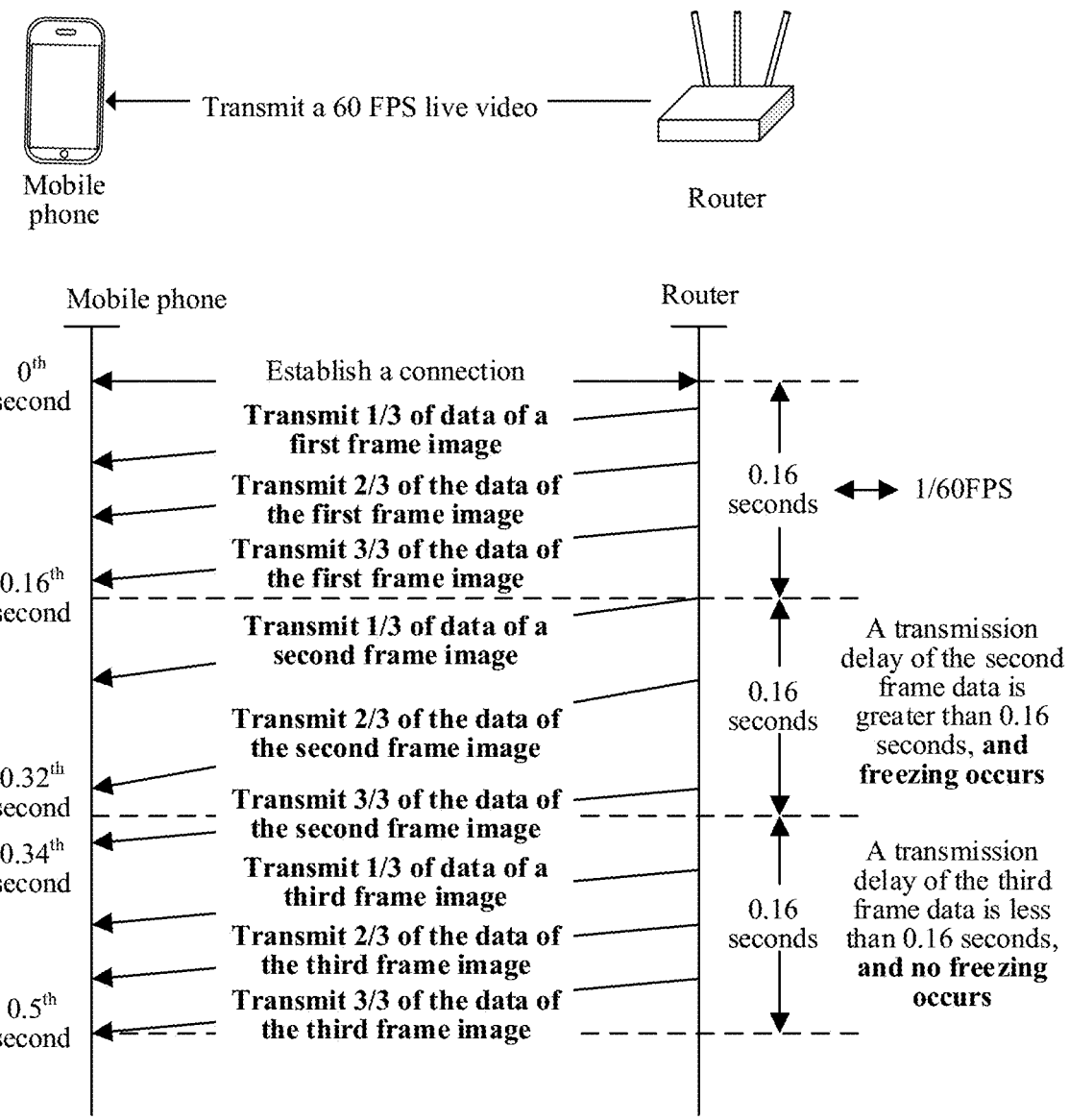
FIG. 3 is a schematic diagram of an example of a relationship between communication performance of a wireless channel and user experience according to this application.

The following uses content shown in FIG. 3 as an example to describe, for example, how communication performance of a wireless channel affects data transmission and user experience.

FIG. 3 is a schematic diagram of an example of a relationship between communication performance of a wireless channel and user experience in this application.

A user uses a mobile phone to watch a 60 frames per second (frames per second, FPS) live video. The mobile phone is connected to the internet by using a Wi-Fi function provided by the router. Because the frame rate of the live video is 60 FPS, when the mobile phone receives data of a frame image at a moment T1, the mobile phone needs to receive data of a next frame image before a moment T2=T1+ 0.16, so that the video can be played smoothly, thereby ensuring user experience.

As shown in FIG. 3, at the $0^{th}$ second, the mobile phone establishes a connection to the router, and receives, based on the connection, video stream data sent by the server. The video data is composed of data of a string of consecutive frame images. When sending the video data to the mobile phone, the server needs to send data of the frame images in sequence. Data of one frame image needs to be carried by one or more network packets. For example, the data of one frame image needs to be carried by three network packets.

In the content shown in FIG. 3, within the $0^{th}$ second to the $0.16^{th}$ second, the service end successfully sends the three network packets that carry data of a first frame image to the mobile phone. Within the $0.16^{th}$ second to the $0.32^{th}$ second, the service end successfully sends the first two of the three network packets that carry data of a second frame image to the mobile phone. The video freezes because the mobile phone does not completely receive the data of the second frame image. At the $0.34^{th}$ second, the mobile phone receives the three network packets that carry the data of the second frame image. Within the $0.34^{th}$ second to the $0.5^{th}$ second, the service end successfully sends the three network packets that carry the data of the second frame image to the mobile phone. In this case, the video does not freeze.

It may be understood that, in most scenarios, compared with increasing an average data transmission rate between the client and the service end, or increasing a peak data transmission rate between the client and the service end, a minimum data transmission rate between the service end and a transmission end is ensured to be not lower than a threshold, which improves user experience.

(4) Service Session and Network Packet

A service session may be a process in which a presentation layer entity or a user process establishes a communication and transmits data over the communication. Based on different capabilities of a protocol stack (protocol stack) on the client, the client may combine one or more data frames of an application/service session to generate a protocol packet, and pack the protocol packet into a network packet for sending. The protocol stack is also referred to as protocol stack, which is a specific software implementation of a computer network protocol.

A process in which the client/service end encapsulates and combines the data frames generated by the application/service session into a network packet may be referred to as encapsulation. Correspondingly, a process of decapsulating the network packet into the data frames may be referred to as decapsulation.

Figure 4A:
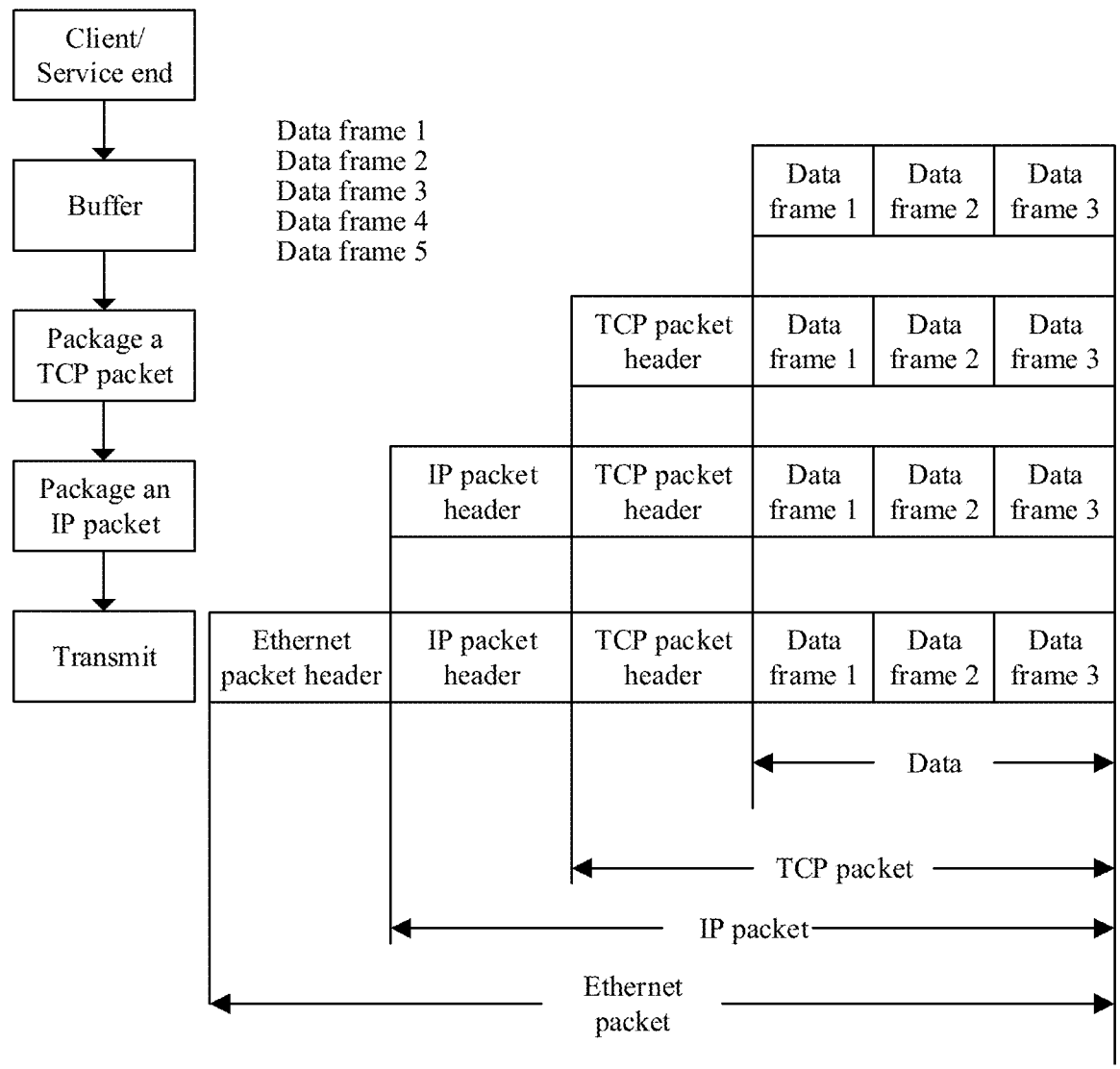
FIG. 4A is a schematic diagram of an example of an encapsulation process according to this application.
Figure 4B:
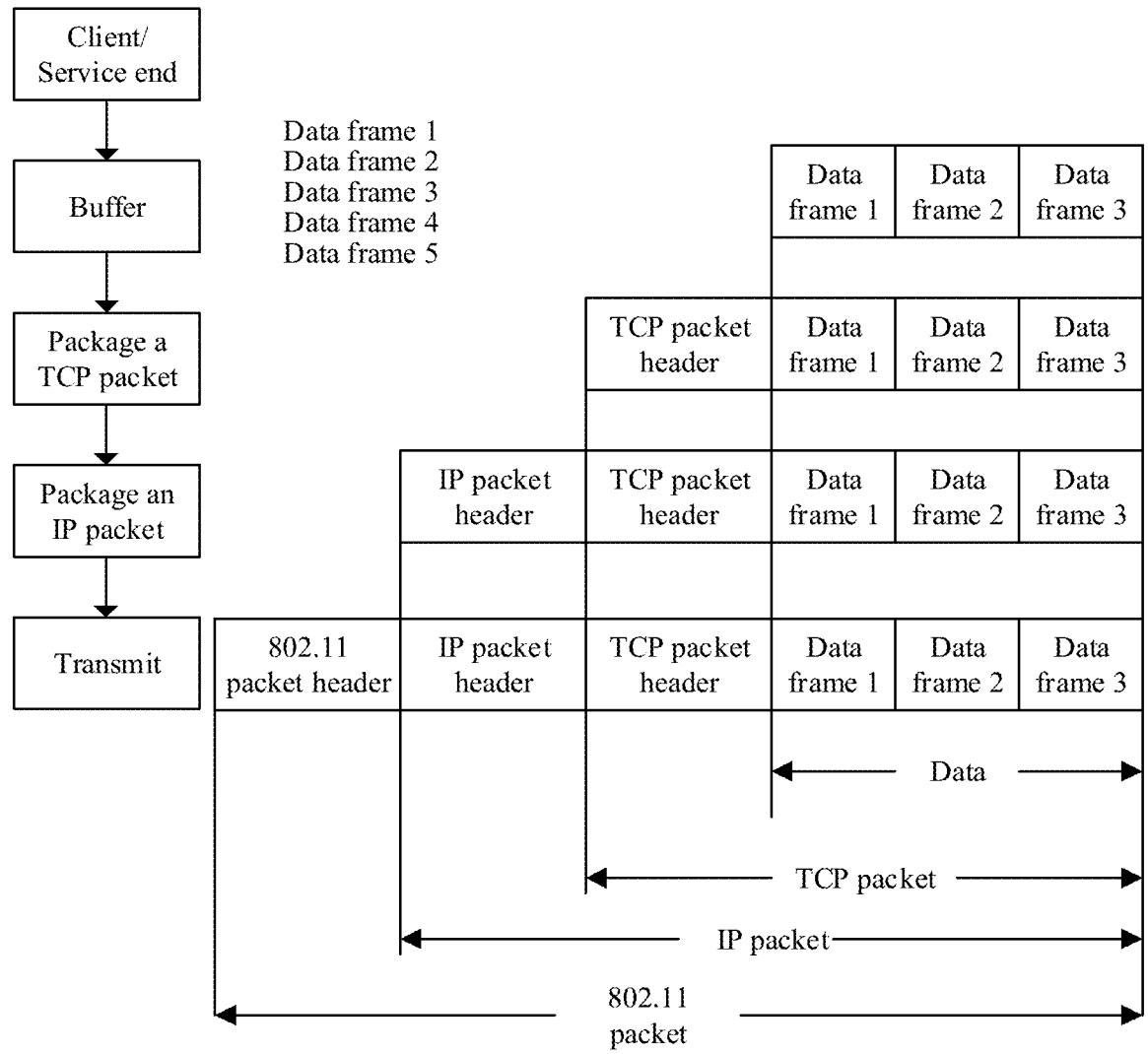
FIG. 4B is a schematic diagram of an example of an encapsulation process according to this application.

The following uses content shown in FIG. 4A and FIG. 4B as an example to describe a process in which a client/service end encapsulates data frames into a network packet according to different protocols.

FIG. 4A is a schematic diagram of an example of an encapsulation process according to this application.

Content shown in FIG. 4A is a process in which the client/service end encapsulates data frames into a network packet when the connection established between the client and the service end is a wired connection. Content shown in FIG. 4B is a process in which the client and the service end encapsulate data into a network packet when the connection established between the client and the service end is a wireless connection.

As shown in FIG. 4A, an application/service session on a client/service end continuously generates data frames, and writes the data frames into a local buffer. At a specific moment, the buffer on the client/service end stores a data frame 1, a data frame 2, a data frame 3, a data frame 4, and a data frame 5. The TCP protocol stack on the client/service end combines the data frame 1, the data frame 2, and the data frame 3 into a TCP packet based on the size of data frames. After the TCP packet is generated, the TCP packet is packaged into an IP packet, and the IP packet is packaged into an Ethernet packet. The Ethernet packet may be referred to as a network packet.

It should be noted that, to reduce overheads of protocol fields such as the TCP/IP protocol, the protocol stack encapsulates a plurality of data frames into one packet as much as possible if a path maximum transmission unit (path maximum transmission unit, PMTU)/maximum transmission unit (maximum transmission unit, PMTU), and a remaining bandwidth allow the encapsulation.

FIG. 4B is a schematic diagram of an example of an encapsulation process according to this application.

As shown in FIG. 4B, similar to content shown in FIG. 4A, a buffer on the client/service end stores a data frame 1, a data frame 2, a data frame 3, a data frame 4, and a data frame 5. The TCP protocol stack on the client/service end combines the data frame 1, the data frame 2, and the data frame 3 into a TCP packet based on the size of data frames. After the TCP packet is generated, the TCP packet is packaged into an IP packet. Different from the content shown in FIG. 4A, the protocol stack on the client encapsulates the IP packet into an 802.11 packet according to a protocol complied by the physical layer/link layer. The 802.11 packet may be referred to as a network packet.

In the content shown in FIG. 4A and FIG. 4B, a process in which the client/service end combines one or more data frames and packs them into a network packet is referred to as encapsulating a network packet.

It should be noted that, in a P2P scenario, when a client establishes a near-field communication service such as a Bluetooth connection with a service end, because the Bluetooth connection is not based on a TCP/UDP protocol, a process in which the client/service end combines data frames and packs them into a Bluetooth network packet is referred to as encapsulating a network packet.

Figure 5:
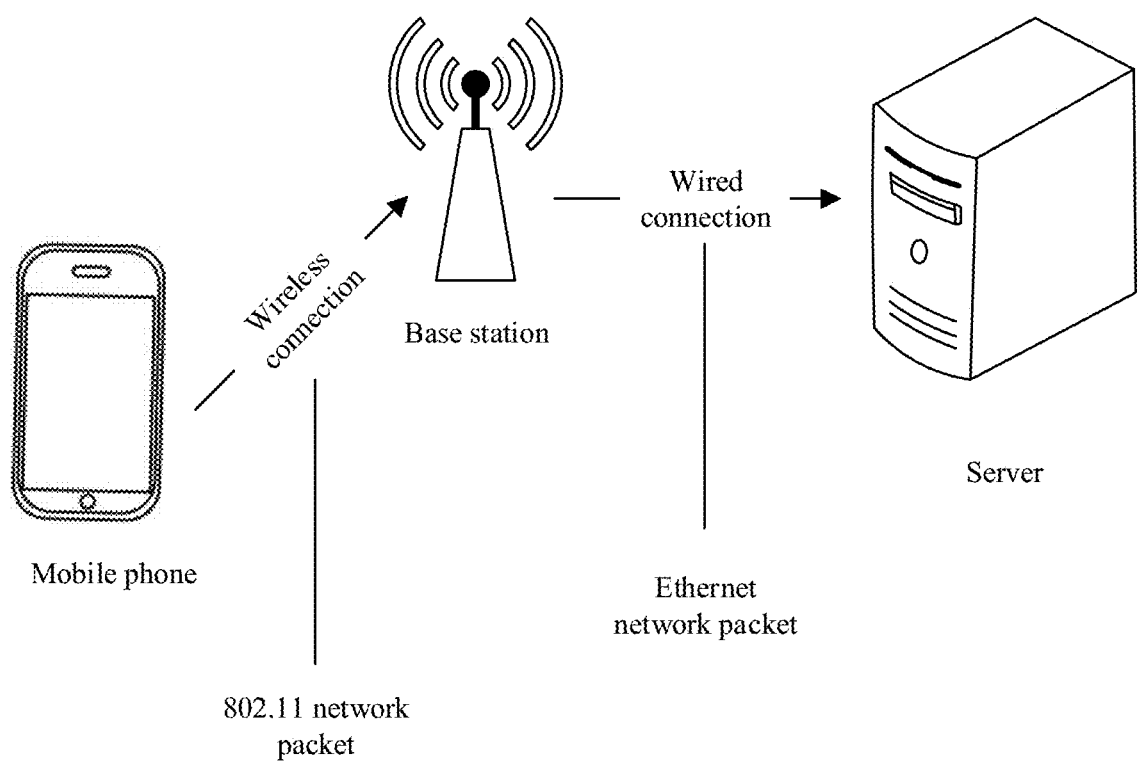
FIG. 5 is a schematic diagram of an example of a network packet change in a data transmission process according to this application.

The following uses content shown in FIG. 5 as an example to describe a process in which a client/service end encapsulates a network packet and a transmission process of the network packet in a wireless network and a wired network.

FIG. 5 is a schematic diagram of an example of a network packet change in a data transmission process according to this application.

As shown in FIG. 5, a mobile phone serving as a client sends data to a server serving as a service end. First, the mobile phone sends data to a base station through cellular mobile communication. In this process, a representation form of the network packet may be an 802.11 network packet. Second, after receiving the 802.11 network packet, the base station decapsulates and encapsulates the network packet, so that a format of the network packet conforms to a format of wired network transmission. The base station can decapsulate the 802.11 network packet, encapsulate the packet into an Ethernet network packet, and send the data to the server.

Second, the following describes two methods to improve the communication performance between the client and the service end by using multipath software.

When one or more connections established between the client and the service end support data transmission through a plurality of paths, the client may allocate different/same network packets to different paths for transmission, so as to improve transmission robustness or increase a transmission rate by using the plurality of paths.

The first method for improving the communication performance between a client and a service end by using a plurality of paths includes:

After a connection is established between the client and the service end, when a protocol stack between the client and the service end supports the MPTCP protocol, it may be considered that there are M available paths between the client and the service end. It is assumed that the M available paths are independent of each other. In this case, when sending data to the service end, the client may send the same data by using the M paths. In this case, a transmission delay between the client and the service end is a transmission delay of a path with a minimum transmission delay in the M paths.

Figure 6:
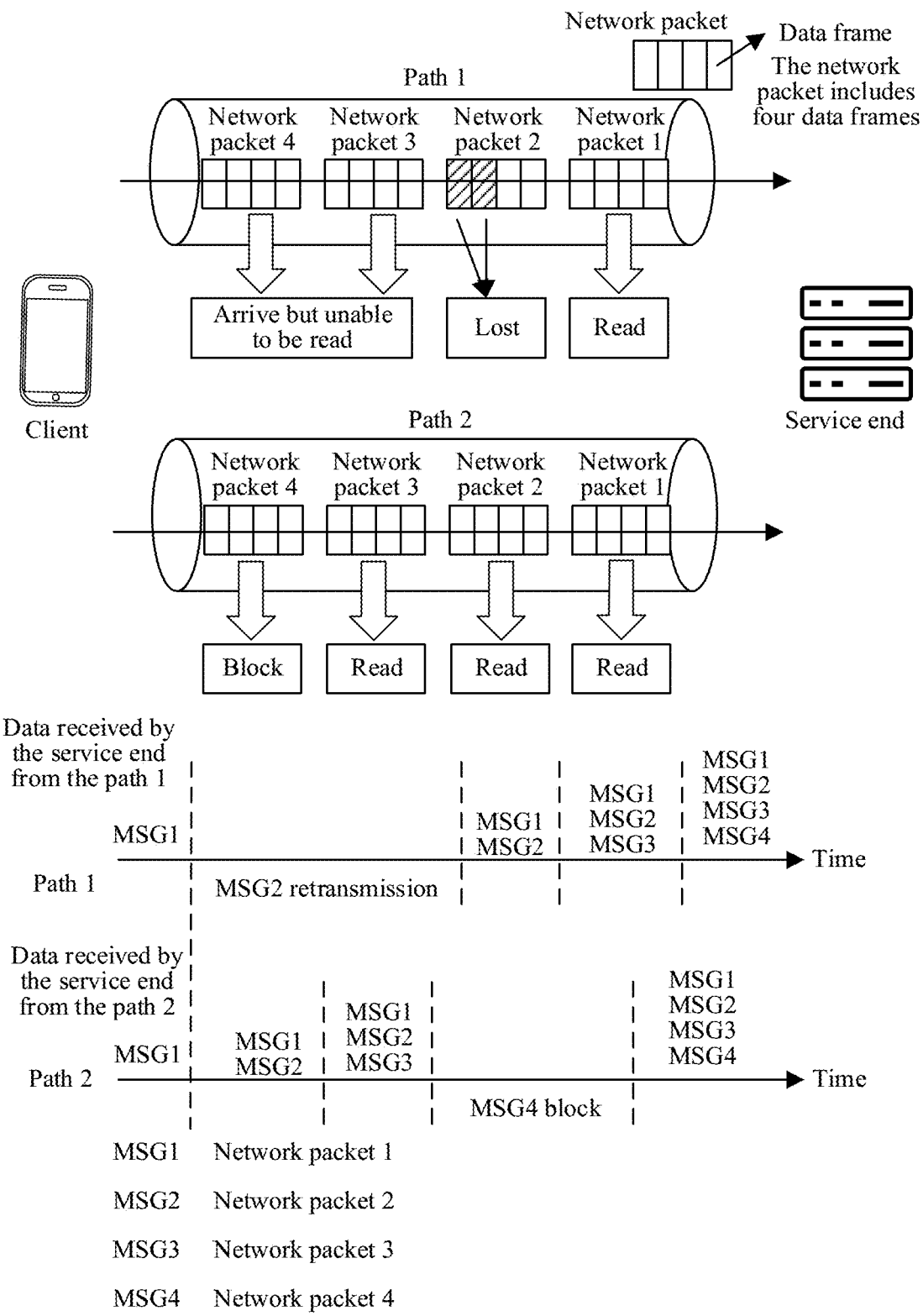
FIG. 6 is a data sending method for multipath aggregation according to this application.

The following uses content shown in FIG. 6 as an example to describe communication performance between a client and a service end when the client sends the same data by using M paths.

FIG. 6 is a data sending method for multipath aggregation according to this application.

When the client and the service end perform data transmission by using a plurality of paths, for example, sending data by the client, the client may send the same data on the plurality of paths, to improve transmission robustness.

As shown in FIG. 6, both the client and the service end support the MPTCP protocol, and data transmission is performed between the client and the service end by using two paths. The network packet sent by the client includes four data frames. With reference to the content shown in FIG. 3, it may be considered that transmission of one frame image can be completed only when the service end successfully receives four network packets.

In a process of transmitting data on a path 1, after receiving a network packet 1 and a network packet 2, the service end finds that some data frames in the network packet 2 are lost, and the network packet 2 needs to be retransmitted. In this case, even if a network packet 3 and a network packet 4 arrive at the service end, the network packet 3 and the network packet 4 are not read by the service end. In this case, it is considered that the delay in which the four network packets are successfully transmitted and correctly read to the service end is $T_{delay1}$, and it is considered that an average data transmission rate on the path 1 is $V_1$.

In a process of transmitting data on a path 2, after the service end receives and reads the network packet 1, the network packet 2, and the network packet 3, the network packet 4 is not transmitted to the service end due to path congestion. In this case, it is considered that the delay in which the four network packets are successfully transmitted and correctly read to the service end is $T_{delay2}$, and it is considered that an average data transmission rate on the path 2 is $V_2$.

With reference to a transmission process of the data on the path 1 and the path 2, it may be considered that a delay in which the four network packets are successfully transmitted and correctly read to the service end is min ($T_{delay1}$, $T_{delay2}$), where min ( ) is a minimum value. The data transmission rate between the client and the service end is max ($V_1$, $V_2$), and max ( ) is a maximum value.

Apparently, if communication performance of data on a path is better than that of another path in most of the time, the method shown in FIG. 6 is equivalent to performing data transmission only on the path with relatively good communication performance.

The second method for improving the communication performance between a client and a service end by using a plurality of paths includes:

After a connection is established between the client and the service end, when a protocol stack between the client and the service end supports the MPTCP protocol, it may be considered that there are M available paths between the client and the service end. Before the service end sends data to the client, the communication performance of different paths needs to be evaluated. The service end allocates to-be-sent data to different paths based on an evaluation result.

Figure 7:
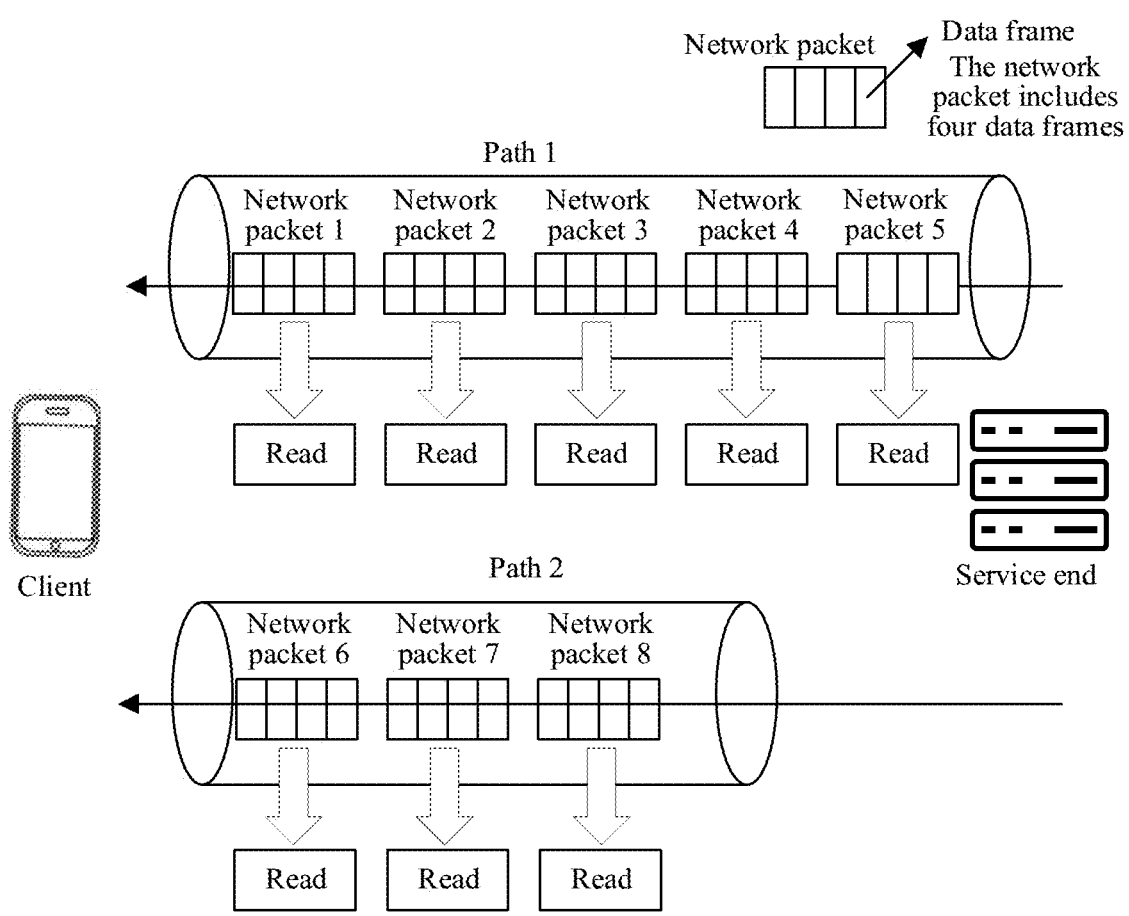
FIG. 7 is another data sending method for multipath aggregation according to this application.

The following uses content shown in FIG. 7 as an example to describe, for example, when the service end allocates, based on the evaluation result, data to M available paths for transmission, to improve a transmission rate and robustness.

FIG. 7 is another data sending method for multipath aggregation according to this application.

Before sending data to the client by using a plurality of paths, the service end may evaluate communication performance of each path, and allocate to-be-sent data to different paths for transmission based on an evaluation result.

As shown in FIG. 7, there are two paths for data transmission between the service end and the client. The service end evaluates communication performance of the path 1 and the path 2, and predicts that a data transmission rate on the path 2 in a future period of time is 0.6 times that of the transmission rate on the path 1. With reference to content shown in FIG. 3, it is considered that data of one frame image is carried by eight network packets, which are respectively a network packet 1 to a network packet 8.

In this case, the service end may allocate the network packet 1, the network packet 2, the network packet 3, the network packet 4, and the network packet 5 to the path 1 for transmission. The network packet 6, the network packet 7, and the network packet 8 are allocated to the path 2 for transmission.

It should be noted that the method shown in FIG. 7 may also be referred to as a min round-trip-time (min Round-Trip-Time, minRTT)-based method.

Figure 8A:
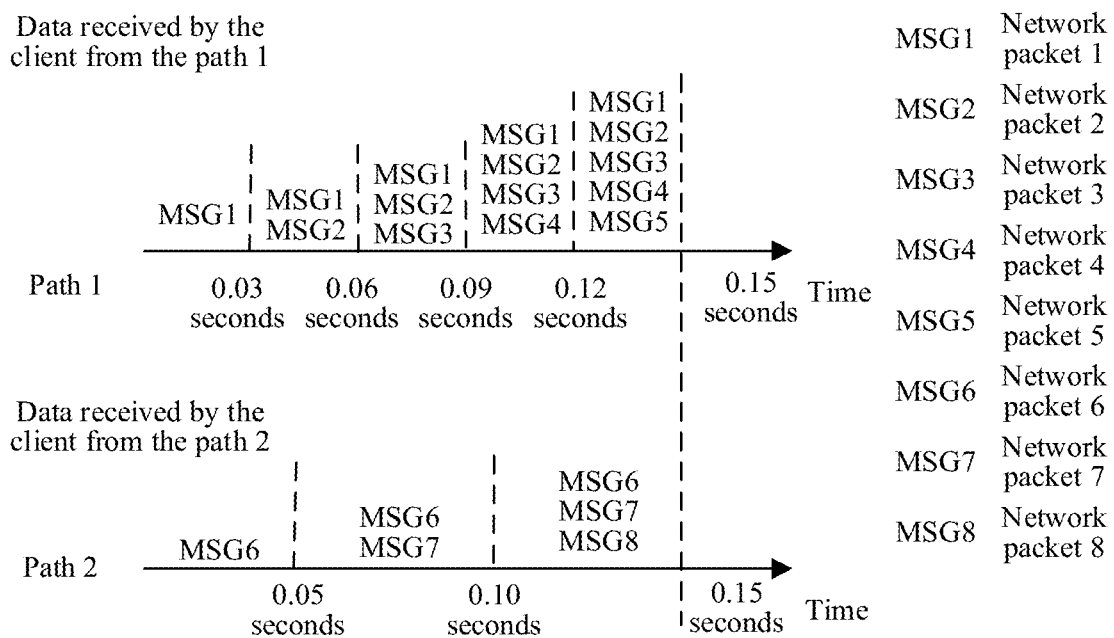
FIG. 8A and FIG. 8B are schematic diagrams of an example in which communication performance of the method shown in FIG. 7 is compared in different cases.
Figure 8B:
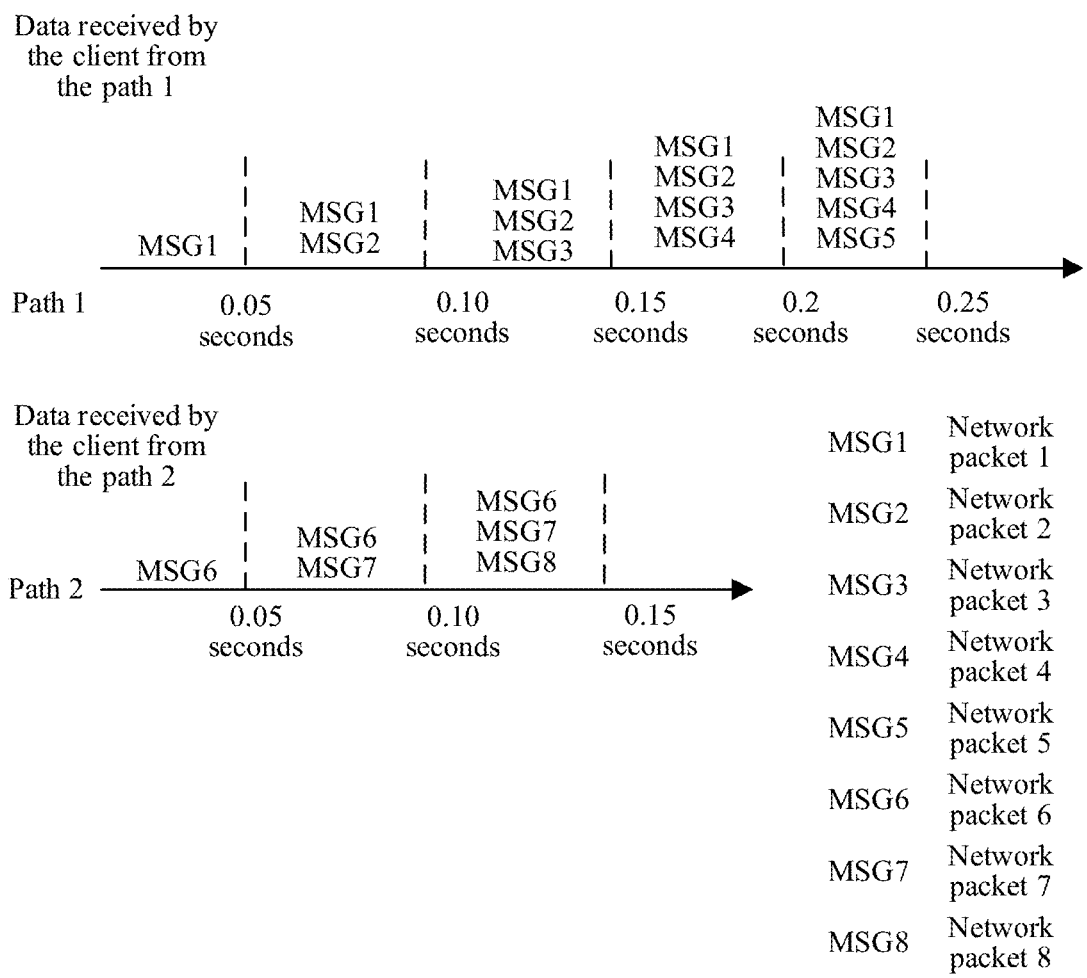

FIG. 8A and FIG. 8B are schematic diagrams of an example in which communication performance of the method shown in FIG. 7 is compared in different cases.

As shown in FIG. 8A, when the network packet 1 to the network packet 8 are transmitted, if the actual communication performance and the predicted communication performance of the path 1 and the path 2 are the same, data of one frame image may reach the client at the same time. The data on path 1 is successfully sent to the client every 0.03 seconds. At the $0.15^{th}$ second, the service end sends the network packet 1, the network packet 2, the network packet 3, the network packet 4, and the network packet 5 to the client. The data on the path 2 is successfully sent to the client every 0.05 seconds. At the $0.15^{th}$ second, the service end sends the network packet 6, the network packet 7, and the network packet 8 to the client.

Therefore, at the $0.15^{th}$ second, the client receives the network packet 1 to the network packet 8, may decapsulate the network packet into a data frame, and submit the data frame to an upper-layer service of the client for processing. If a data transmission rate on the path 1 is $V_1$, and a data transmission rate on the path 2 is $V_2$ in the case shown in FIG. 8A, a rate of data transmission between the service end and the client is $V_1+V_2$.

If actual communication performance and predicted communication performance of the path 1 and the path 2 are different when the network packet 1 to the network packet 8 are transmitted, the method reduces a data transmission rate.

As shown in FIG. 8B, if a data transmission rate on a path 1 is the same as a data transmission rate on a path 2, that is, the service end successfully sends a network packet to the client every 0.05 seconds on both the path 1 and the path 2. In this case, because the service end allocates more data to the path 1 for transmission, when the client receives the network packet 1, the network packet 2, the network packet 3, the network packet 6, the network packet 7, and the network packet 8, the network packet 4 and the network packet 5 need to be received.

Further, if severe data congestion occurs on the path 1, the client cannot receive data of a complete frame image for a long time.

It may be understood that, with reference to the content shown in FIG. 6, it may be learned that the client/service end does not need to predict communication performance of data on different paths. Simply transmitting data by using a plurality of paths can only improve transmission robustness, which is equivalent to path multiplexing. Different paths back up each other to avoid a high data transmission delay caused by data congestion on a single path.

It may be understood that, with reference to the content shown in FIG. 7, FIG. 8A, and FIG. 8B, if the client/service end can accurately predict instantaneous communication performance of the plurality of paths at one or more packet transmission moments, in this case, the network packets may be allocated to different paths for transmission, so as to improve the transmission rate. However, although the client/service end can predict the average data transmission rate on different paths in a period of time, it is difficult to accurately predict the instantaneous data transmission rate on different paths at a specific moment. In addition, when the link layer/physical layer of the path includes a wireless channel, which further increases the instantaneous transmission rate of the predicted data on the path. When the client/service end allocates the network packets based on an inaccurate data transmission rate, a data transmission rate between the client and the service end is reduced, and the data transmission rate may be lower than the method shown in FIG. 6.

Figure 9A:
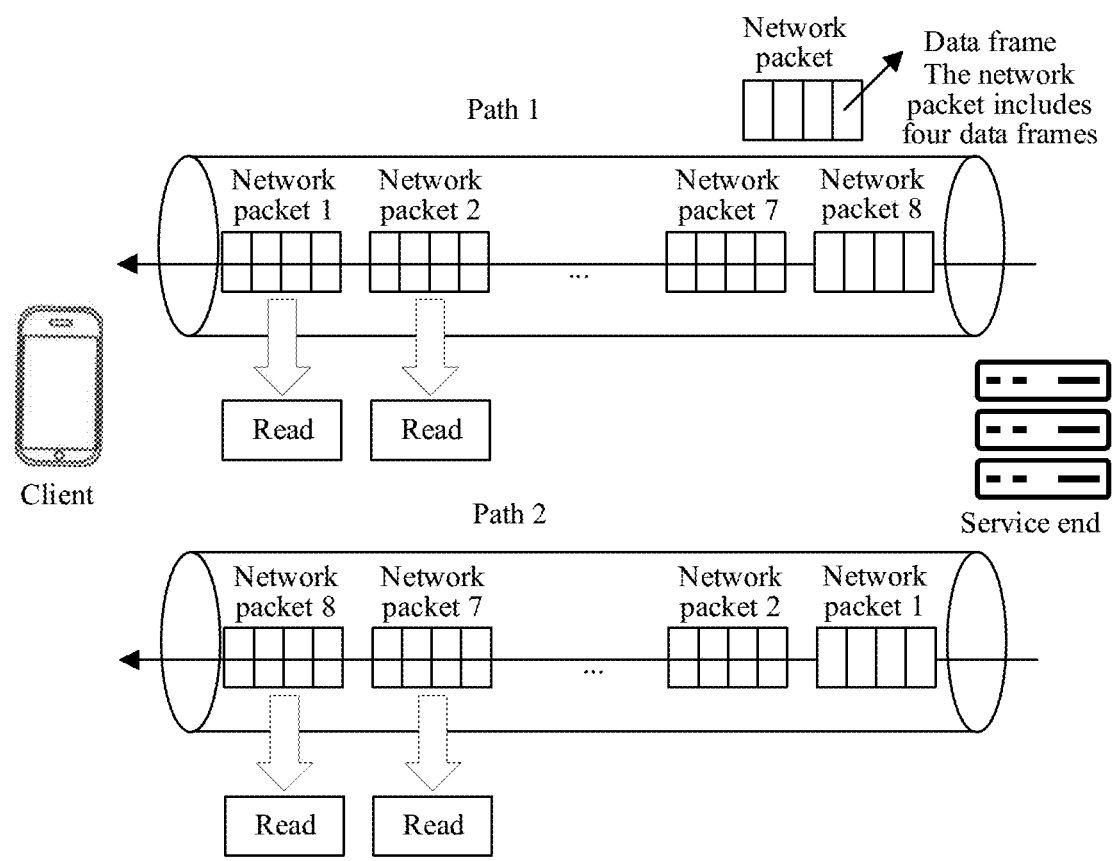
FIG. 9A and FIG. 9B are schematic diagrams of an example of a multipath aggregation scheduling method according to an embodiment of this application.
Figure 9B:
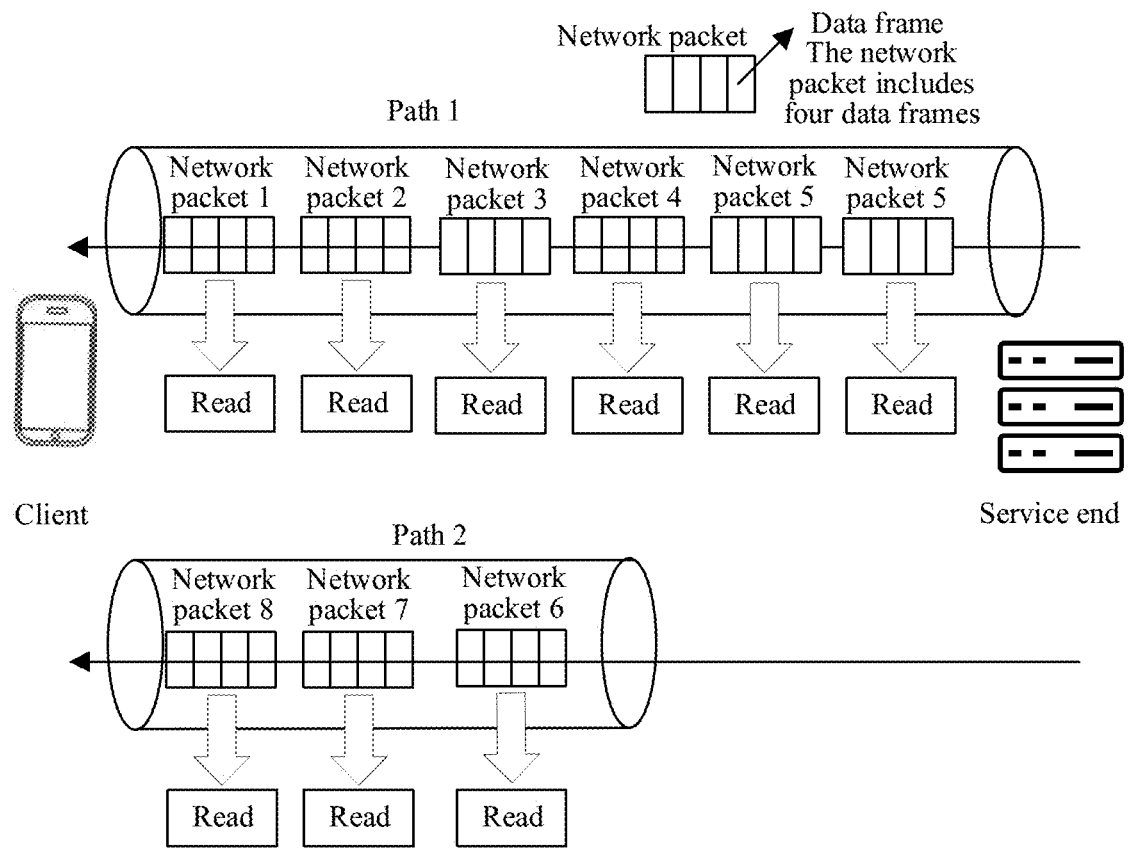
Figure 9C:
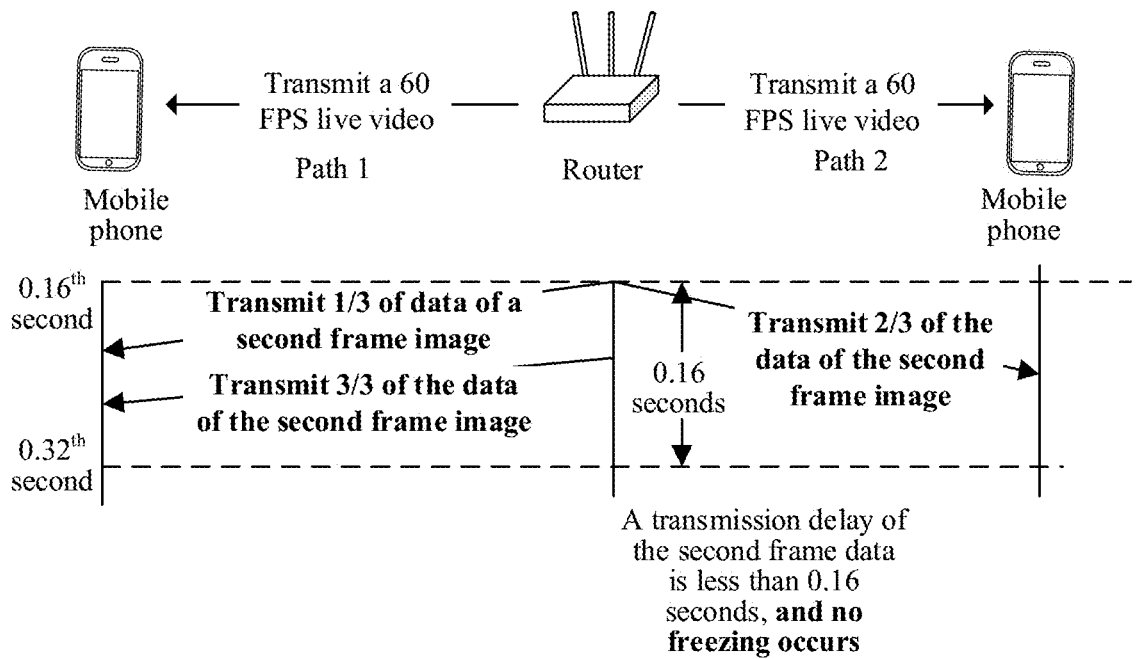
FIG. 9C is a schematic diagram of an example in which a multipath aggregation scheduling method in an embodiment of this application is implemented in a scenario shown in FIG. 3.

Again, compared with the two methods shown in FIG. 6, FIG. 7, FIG. 8A, and FIG. 8B, the following uses FIG. 9A, FIG. 9B, and FIG. 9C as an example to describe the multipath aggregation scheduling method provided in this application.

FIG. 9A and FIG. 9B are schematic diagrams of an example of a multipath aggregation scheduling method according to an embodiment of this application.

The client/service end may send a plurality of network packets in different orders. For example, in a scenario similar to the scenarios shown in FIG. 6 and FIG. 7, the service end sends eight network packets that carry data of one frame image to the client: a network packet 1 to a network packet 8. Both the client and the service end support the MPTCP protocol, and data is transmitted between the client and the service end by using two paths.

As shown in FIG. 9A, the service end allocates the network packets to a path 1 for transmission in an order of the network packet 1, the network packet 2, the network packet 3, the network packet 4, the network packet 5, the network packet 6, the network packet 7, and the network packet 8. Correspondingly, the service end allocates the network packets to a path 2 for transmission in an order of the network packet 8, the network packet 7, the network packet 6, the network packet 5, the network packet 4, the network packet 3, the network packet 2, and the network packet 1.

After the client receives the network packets completely, that is, after the client receives the network packet 1 to the network packet 8, the client may return an acknowledgment (ACK) packet to the service end, so that the client stops redundant sending.

As shown in FIG. 9B, because a data transmission rate on the path 1 is different from a data transmission rate on the path 2, the client receives the network packet 1 to the network packet 5 on the path 1, and receives the network packet 8 to the network packet 6 on the path 2. After receiving the network packet 1 to the network packet 8, the client sends an acknowledgment packet to notify the service end that the network packet 1 to the network packet 8 have been completely received. In this case, the service end stops sending the network packet 6 to the network packet 8 on the path 1, and the service end stops sending the network packet 5 to the network packet 1 on the path 2.

If the data transmission rate on the path 1 is $V_1$, and the data transmission rate on the path 2 is $V_2$, in the case shown in FIG. 8A, a rate of data transmission between the service end and the client is $V_1+V_2$.

According to the multipath aggregation scheduling method provided in this embodiment of this application, a cross-correlation of network packet arrangement orders on different paths is minimized. The cross-correlation may be used to measure a correlation between two sequences. If similarity between the two sequences is higher, the cross-correlation between the two sequences is greater. If similarity between the two sequences is lower, the cross-correlation between the two sequences is smaller. When the cross-correlation of transmission orders of network packets on different paths is smaller, for any network packet, when the transmission order of the network packet on any path is in the second half of the whole, the transmission order of the packet needs to be in the first half of the whole on another path.

For the data sending method for multipath aggregation shown in FIG. 6, an order $Order_1$ of transmitting network packets on a first path in the method is [1, 2, 3, 4]. In this method, an order $Order_2$ of transmitting network packets on a second path is [1, 2, 3, 4]. In this case, the cross-correlation between $Order_1$ and $Order_2$ is 1, and the cross-correlation is the largest.

Alternatively, according to the multipath aggregation scheduling method provided in this embodiment of this application, distances between arrangement orders of network packets on different paths are maximized. That is, it may be considered that an arrangement order of the N network packets on different paths is one coordinate in an N-dimensional space. For example, when $Order_1$ is [1, 2, 3, 4], a coordinate corresponding to $Order_1$ is (1, 2, 3, 4) in a four-dimensional space, and the coordinate that is furthest from the $Order_1$ is (4, 3, 2, 1), that is, $Order_2$ is [4,3, 2, 1]. For another example, when $Order_1$ is [1, 3, 2, 4], a coordinate corresponding to $Order_1$ is (1, 3, 2, 4) in a four-dimensional space, and the coordinate that is furthest from the $Order_1$ is (4, 2, 3, 1), that is, $Order_1$ is [4, 2, 3, 1].

If the multipath aggregation scheduling method provided in this application is implemented in the scenario shown in FIG. 6, when an order $Order_1$=[1, 2, 3, 4] in which network packets are transmitted on the first path, an order $Order_2$=[4, 3, 2, 1] in which the network packets are transmitted on the second path. Alternatively, when $Order_1$=[1, 3, 2, 4] in which the network packets are transmitted on the first path, an order $Order_2$=[4, 2, 3, 1] in which the network packets are transmitted on the second path. Alternatively, when $Order_1$= [1, 4, 2, 3] in which the network packets are transmitted on the first path, an order $Order_2$=[3, 2, 4, 1] in which the network packets are transmitted on the second path. Alternatively, when $Order_1$=[1, 4, 3, 2] in which the network packets are transmitted on the first path, an order $Order_2$=[2, 3, 1, 4] in which the network packets are transmitted on the second path.

It should be noted that, if there are two paths between the client and the service end, a manner of minimizing the cross-correlation between the arrangement orders of network packets on different paths is as follows: An arrangement order of the network packets on the first path is inverse to an arrangement order of the network packets on the second path. If there are a plurality of paths between the client and the service end, a sum of cross-correlations of the arrangement orders of network packets on different paths needs to be minimized.

Optionally, in some embodiments of this application, the cross-correlation of the arrangement orders of network packets on different paths may be less than 1. Alternatively, a distance corresponding to the arrangement orders of network packets on different paths may be greater than 1.

It may be understood that, first, in the multipath aggregation scheduling method provided in this application, communication performance of different paths does not need to be predicted, thereby reducing overheads for predicting path communication performance, and avoiding a negative impact caused by inaccurate prediction of path communication performance. In addition, according to the multipath aggregation scheduling method provided in this application, redundant packet sending is avoided, and network bandwidth is saved.

With reference to the scenario shown in FIG. 3, the method shown in FIG. 6 is compared with the multipath aggregation scheduling method provided in this application.

FIG. 9C is a schematic diagram of an example in which a multipath aggregation scheduling method in an embodiment of this application is implemented in a scenario shown in FIG. 3.

Considering that the method shown in FIG. 6 is equivalent to transmitting a network packet on a path with relatively good communication performance, it may be considered that the scenario shown in FIG. 3 is a scenario in which the data sending method for multipath aggregation shown in FIG. 6 is implemented. In the scenario shown in FIG. 9C, a data transmission rate on the path 1 is the same as a data transmission rate in the scenario shown in FIG. 3.

When it is considered that three network packets corresponding to data of a second frame image in the scenario shown in FIG. 3 are respectively the network packet 1, the network packet 2, and the network packet 3, the multipath aggregation scheduling method provided in this embodiment of this application is implemented, so that the network packet 2 is transmitted on the path 2. As long as the transmission delay of the network packet 2 is less than 0.16 seconds, it can be ensured that the network packet 1, the network packet 2, and the network packet 3 are transmitted to the mobile phone within 0.16 seconds.

Obviously, compared with the method shown in FIG. 6, a transmission rate of the network packet can be greatly improved by using the multipath aggregation scheduling method provided in this embodiment of this application.

It should be noted that in the TCP protocol and another protocol based on the TCP protocol, an order of the network packet may be a TCP sequence number of the network packet.

It should be noted that the order of the network packet may be an order in which the client encapsulates and obtains the network packet.

Figure 10:
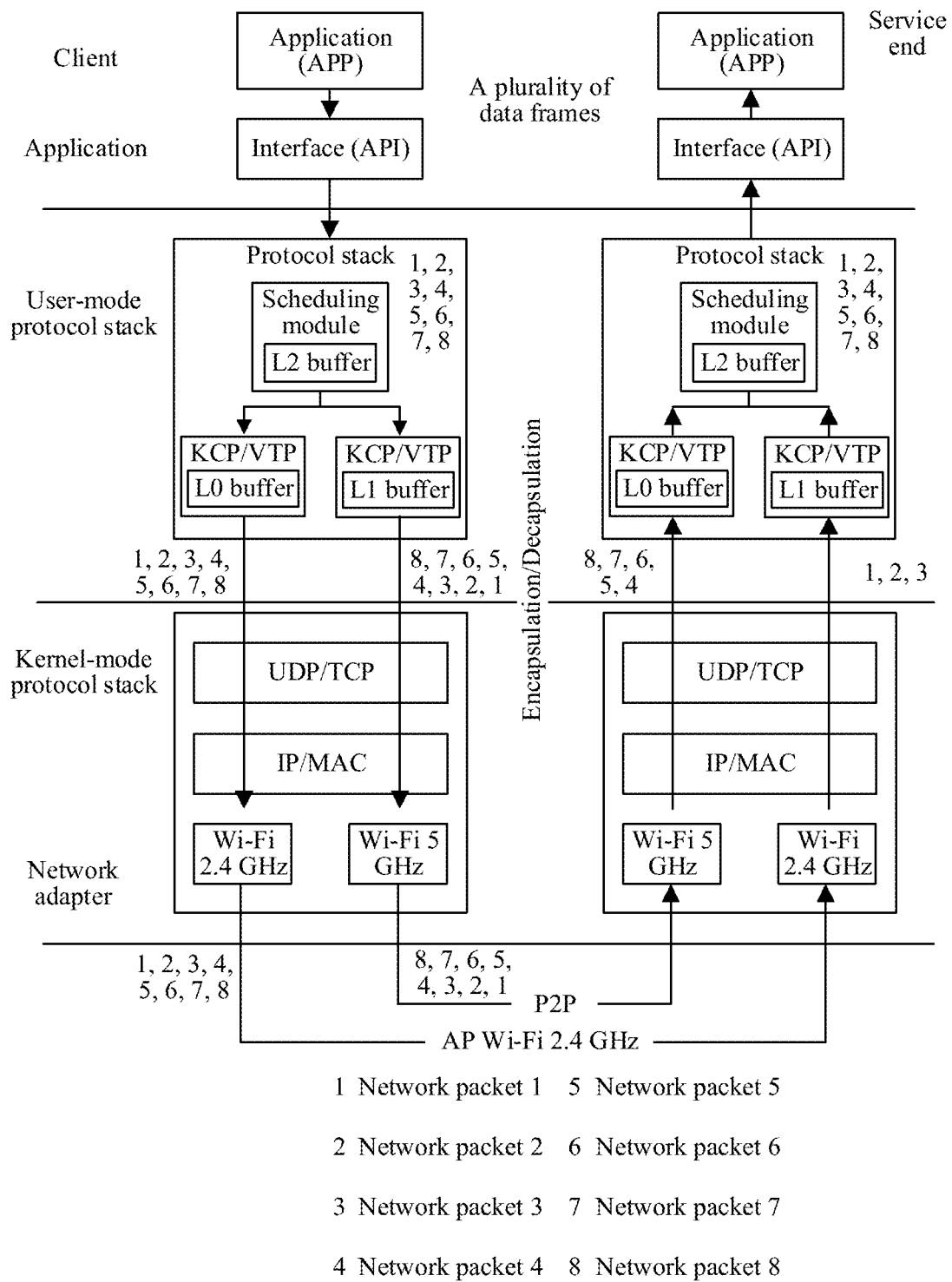
FIG. 10 is a schematic diagram of an example of a protocol stack architecture of a multipath aggregation scheduling method according to an embodiment of this application.

Again, with reference to content shown in FIG. 10, the following describes an example of a protocol stack architecture of the multipath aggregation scheduling method provided in this application.

FIG. 10 is a schematic diagram of an example of a protocol stack architecture of a multipath aggregation scheduling method according to an embodiment of this application.

As shown in FIG. 10, after generating data, an application on a client sends a plurality of data frames to a user-mode protocol stack and a kernel-mode protocol stack by using an interface. The user-mode protocol stack may use an L2 buffer to temporarily store the plurality of data frames generated by the application. Based on different protocol stack capabilities, data frames may be encapsulated into network packets of a corresponding protocol. The user-mode protocol stack is mainly responsible for allocating packets obtained after the data frames are combined to different paths, and transmitting the packets to the kernel-mode protocol stack. After receiving the packets, the kernel-mode protocol stack encapsulates the packets into a format suitable for transmission based on the protocol, and sends the packets to the service end through the corresponding network adapters of different paths.

The kernel-mode protocol stack may include a KCP protocol/virtual local area network trunking protocol (virtual local area network trunking protocol). The user-mode protocol stack may include a TCP/UDP protocol, an IP protocol, and the like. The L2 buffer, an L1 buffer, and an L0 buffer can be obtained from a memory on the client.

As shown in FIG. 10, a path 1 may be a wireless channel provided by a 2.4 GHz frequency band of Wi-Fi, and a path 2 may be a 5G channel provided by a 5 GHz frequency band of Wi-Fi for point-to-point transmission in a P2P scenario.

Correspondingly, after the service end receives data by using the network adapters corresponding to different paths, data on the network adapters is first sent to the kernel-mode protocol stack to start decapsulation. The kernel-mode protocol stack preliminarily decapsulates the data, obtains the corresponding protocol packet, and transmits the packet to the user-mode protocol stack. In a process of receiving the data sent by the kernel-mode protocol stack, the user-mode protocol stack continuously checks whether eight network packets are received completely. After confirming that the eight network packets have been received, the service end may send an acknowledgment packet to the client, so that the client stops sending network packets, thereby avoiding redundant sending. After receiving the acknowledgment packet, the client discards the network packet 4, the network packet 5, the network packet 6, the network packet 7, and the network packet 8 in an L0 buffer pool in time, and discards the network packet 1, the network packet 2, and the network packet 3 in an L1 buffer pool in time.

It may be understood that the multipath aggregation scheduling method provided in this application may be implemented by a protocol stack of a client/service end that supports the multipath transmission protocol.

Figure 11:
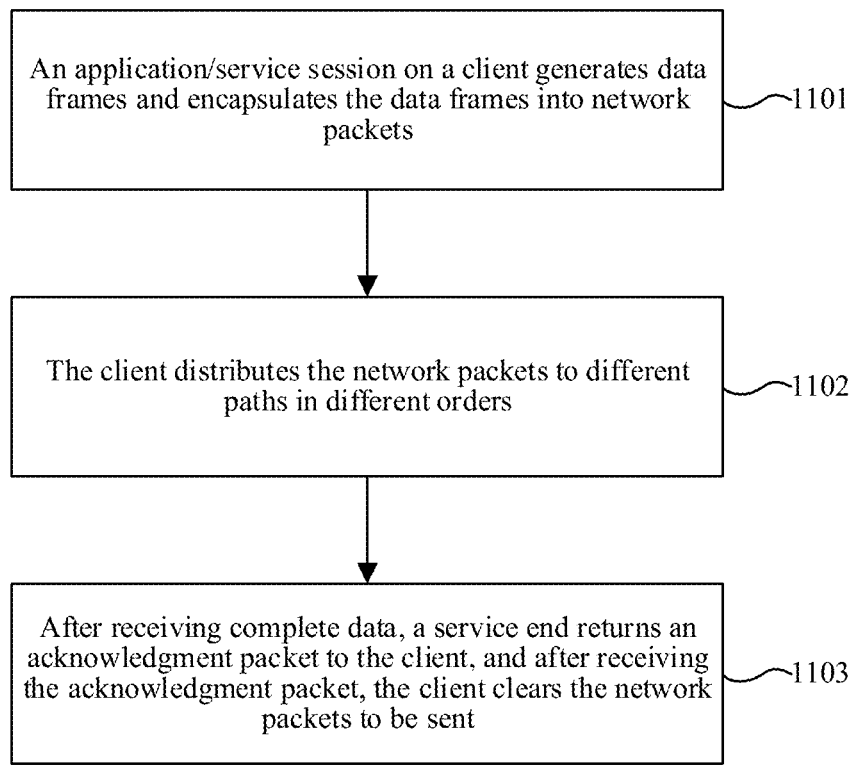
FIG. 11 is a schematic diagram of an example of a multipath aggregation scheduling method according to an embodiment of this application.

Again, the following uses the content shown in FIG. 11 as an example, and uses an example in which a client sends data to a service end to describe the multipath aggregation scheduling method provided in this application.

FIG. 11 is a schematic diagram of an example of a multipath aggregation scheduling method according to an embodiment of this application.

Step S1103 in FIG. 11 is an optional step.

As shown in FIG. 11, the multipath aggregation scheduling method provided in an embodiment of this application includes the following steps.

S1101: An application/service session on a client generates data frames and encapsulates the data frames into network packets.

Specifically, the application/service session on the client may generate one or more data frames in response to an action of a user, and encapsulate the data frames into network packets based on the protocol stack capabilities between the client and the service end. Step S1102 is performed.

For a process of encapsulating the data frames into the network packets, refer to text descriptions in (4) Service session and network packet in the term explanation. Details are not described herein again.

Protocol stacks on both the client and the service end support the multipath transmission protocol.

S1102: The client distributes the network packets to different paths in different orders.

Specifically, based on different protocol stack architectures, the client encapsulates the data frames into the network packets, and allocates the network packets to different paths. Alternatively, in a process of encapsulating the data frames into the network packets, the client has allocated the network packets to different paths. End.

Optionally, in some embodiments of this application, after step S1102 is performed, step S1103 may be performed.

Before allocating the network packets to different paths, the client may know a quantity of currently available paths in advance based on the protocol stack. If the quantity of available paths is M, there are mainly two methods for allocating the network packets to different paths.

Figure 12A:
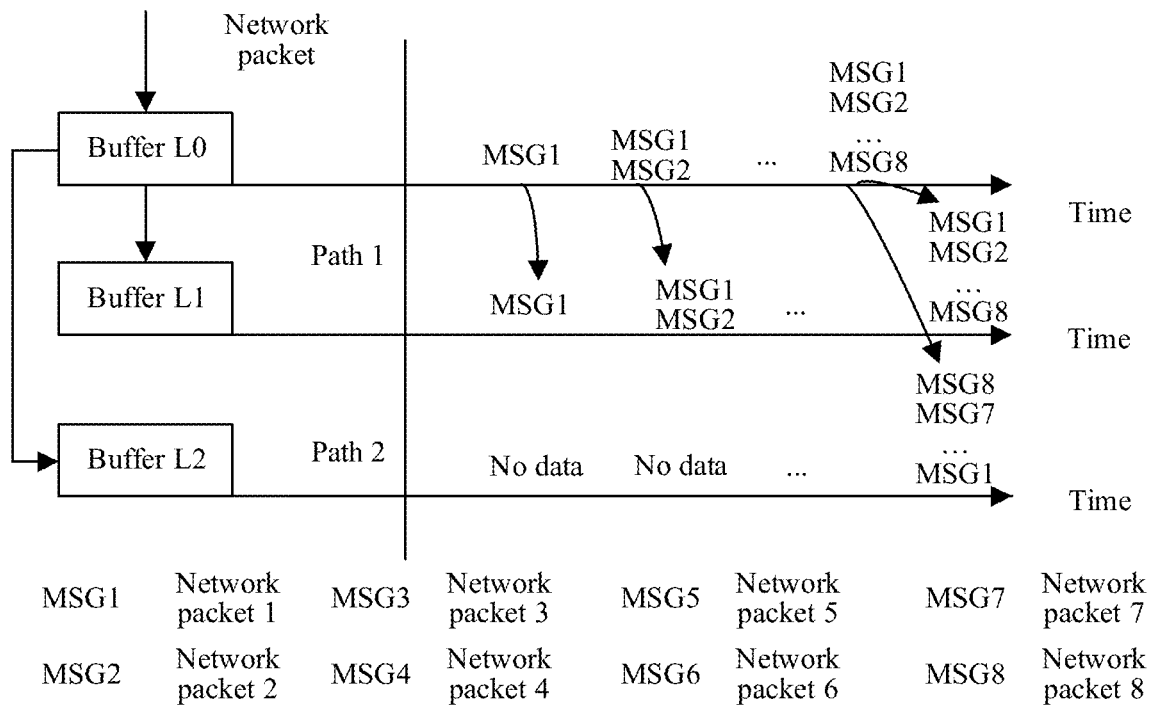
FIG. 12A is a schematic diagram of an example of a network packet allocation method according to an embodiment of this application.
Figure 12B:
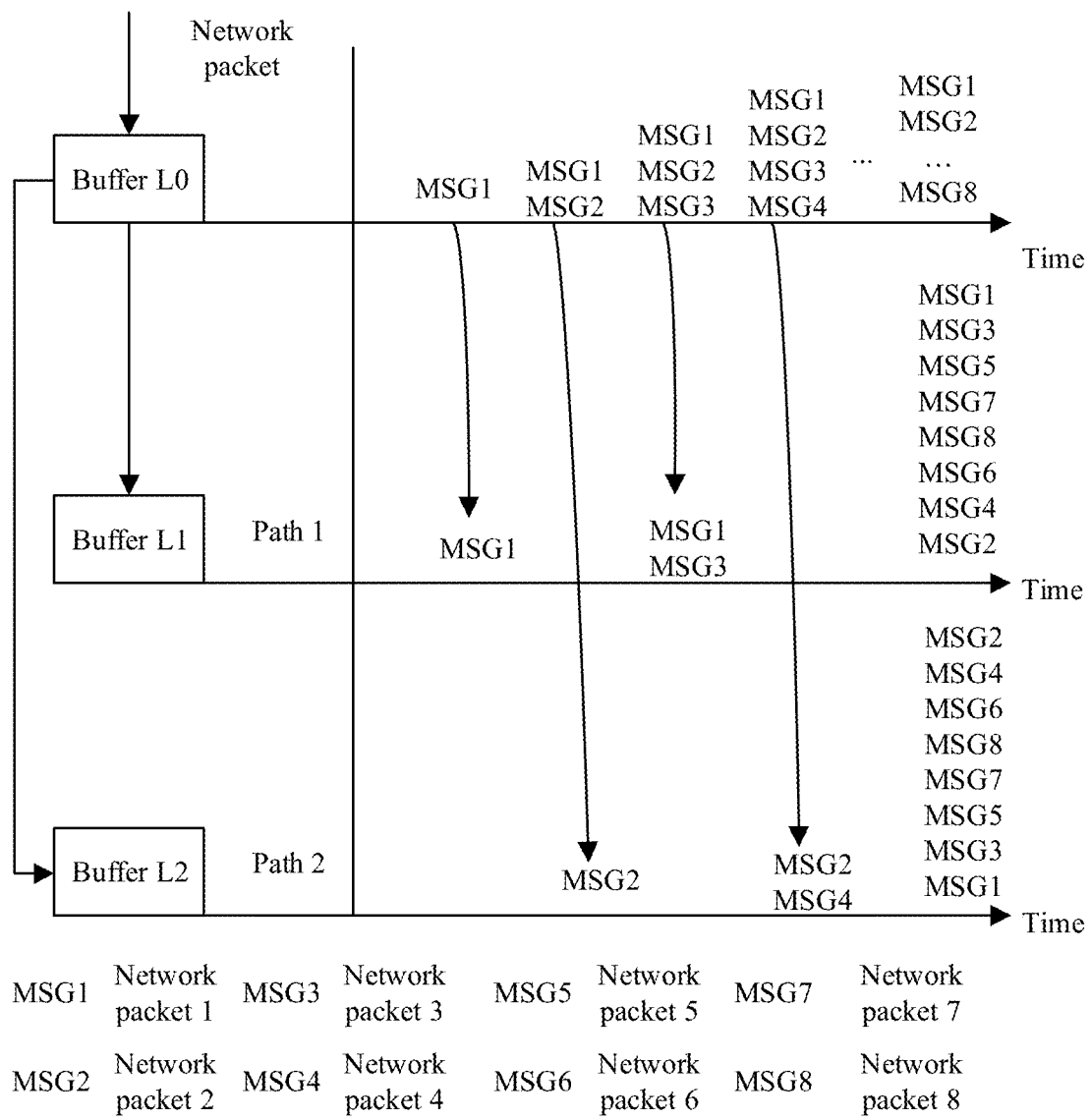
FIG. 12B is another schematic diagram of an example of a network packet allocation method according to an embodiment of this application.

The following uses content shown in FIG. 12A and FIG. 12B as an example to describe how to allocate network packets to different paths.

After the client encapsulates data frames into network packets, the network packets are allocated to different paths in order. Because the client generates data frames in order, the client encapsulates and obtains the network packets in order. For the TCP protocol and a TCP-based upper-layer protocol, an order of network packets may be a TCP sequence number.

FIG. 12A is a schematic diagram of an example of a network packet allocation method according to an embodiment of this application.

As shown in FIG. 12A, the client sequentially performs encapsulation to obtain a network packet 1, a network packet 2, a network packet 3, a network packet 4, a network packet 5, a network packet 6, a network packet 7, and a network packet 8. In a process of obtaining the network packet through encapsulation, the client sequentially places the network packet in a buffer L1 corresponding to the path 1 based on an encapsulation order, that is, an order $Order_1=[1, 2, 3, 4, 5, 6, 7, 8]$ of transmitting the network packet on the path 1. Correspondingly, after obtaining the network packet 8 through encapsulation, the client places the network packet in a buffer L2 corresponding to the path 2 in a reverse order, that is, an order $Order_2=[8, 7, 6, 5, 4, 3, 2, 1]$ of transmitting the network packet on the path 2.

It should be noted that a network packet in the buffer is sent in time, and in the case shown in FIG. 12A, eight network packets are not stacked.

Apparently, when the client implements the network packet allocation method shown in FIG. 12A, the client needs to encapsulate a specific quantity of network packets before allocating the network packet to the path 2 for transmission, and there is a specific delay. Although network packet allocation causes a specific delay, an order of magnitude of the delay is lower than that of the transmission delay caused by path congestion, and can be ignored.

Further, the delay of the client in allocating the network packets may be reduced by using the allocation method shown in FIG. 12B.

FIG. 12B is another schematic diagram of an example of a network packet allocation method according to an embodiment of this application.

As shown in FIG. 12B, after encapsulating data frames into network packets, the client interleaves the allocation of the network packets on a path 1 and a path 2. That is, an order $Order_1=[1, 3, 5, 7, 8, 6, 4, 2]$ in which the network packets are transmitted on the path 1; and an order $Order_2=[2, 4, 6, 8, 7, 5, 3, 1]$ in which the network packets on the path 2.

It may be understood that, in the case shown in FIG. 12B, the client may deliver the network packets in the buffer L0 to the buffer L1 and the buffer L2 in time.

In some embodiments of this application, after receiving the network packet 1 to the network packet 8, the service end returns an acknowledgment packet to the client, and the client clears the remaining network packet 1 to the network packet 8 in the buffer L1 and the buffer L2, thereby avoiding redundant sending.

For example, in the case shown in FIG. 12A, the order of network packets actually transmitted on the path 1 may be $Order_1=[1, 2, 3, 4, 5, 6]$, and the order of network packets actually transmitted on the path 2 may be $Order_2=[8, 7]$. In the case shown in FIG. 12B, the order of network packets actually transmitted on the path 1 may be $Order_1=[1, 3, 5]$, and the order of network packets actually transmitted on the path 2 may be $Order_2=[2, 4, 6, 8, 7]$.

The two main ways in which the client distributes network packets to different paths have been described above. In this embodiment of this application, it may be considered that how the client allocates the network packets to different paths determines a transmission order of the network packets on different paths. Alternatively, it may also be considered that an order in which network packets are transmitted on different paths determines how the client allocates a network to different paths.

The following separately describes a manner in which a client/service end determines a transmission order of network packets on different paths to determine to allocate the network packets to different paths, and describes a manner in which a client/service end determines a transmission order of network packets on different paths by determining that the network packets are allocated to different paths.

First, a manner in which a client/service end determines a transmission order of network packets on different paths to determine to allocate the network packets to different paths includes:

First, the client and the service end determine, based on the protocol stack capability, that a quantity of paths that can be used for data transmission is M.

Second, the client determines that a quantity of network packets in one data block is N, and one data block is a minimum available processing unit of the multipath aggregation scheduling method provided in this application. The network packet is a minimum unit that forms a data block, and one data block includes at least two network packets. The service end may complete at least one function when receiving the data block. For example, in the field of streaming media transmission, one data block may be data of one or more frame images. Alternatively, when the client transmits a plurality of files to the service end, one data block may be data of one or more files.

Third, the client divides the data block into M sub-data blocks, which are respectively denoted as $M_K$, K=1, 2, 3, . . . , M. $M_K$ refers to a $K^{th}$ sub-data block in the M sub-data blocks.

When the data block corresponds to the data of one frame image, the sub-data block may correspond to a part of the data of one frame image. For example, a frame image is divided into M sub-images that are equally divided or unequally divided from top to bottom, and data corresponding to each sub-image is one sub-data block.

The client may establish an M*M data matrix $A_{M*M}$, and fill the M sub-data blocks into the data matrix by using a Sudoku algorithm, so that no repeated sub-data block occurs in data in each row of the data matrix $A_{M*M}$, and no repeated sub-data block occurs in data in each column of $A_{M*M}$. In this case, an order of sub-data blocks in an $I^{th}$ row in the data matrix $A_{M*M}$ is an order of data transmission on the $I^{th}$ path.

It should be noted that sub-data blocks in each row and each column in the data matrix $A^{M*M}$ can form a complete data block.

In this embodiment of this application, when arrangement orders of network packets in sub-data blocks are different, sub-data blocks are still considered as same sub-data blocks. For example, if a sub-data block 1 is [network packet 1, network packet 2], a data block [network packet 2, network packet 1] is the same as the sub-data block 1.

FIG. 13A and FIG. 13B are schematic diagrams of an example of a data matrix according to an embodiment of this application.

When M=3, a data matrix $A_{M*M}$ is shown in FIG. 13A, where the first row is successively a sub-data block 1, a sub-data block 2, and a sub-data block 3. The second row is successively a sub-data block 3, a sub-data block 1, and a sub-data block 2. The second row is successively a sub-data block 2, a sub-data block 3, and a sub-data block 1.

It should be noted that, when M=2, the first row of the data matrix $A_{2*2}$ is successively a sub-data block 1 and a sub-data block 2. The second row is a sub-data block 2 and a sub-data block 1. Each row and each column of the data matrix $A_{2*2}$ form a complete data block, and there is no redundancy. The sub-data block 1 in the first row and the sub-data block 2 in the second row that are of the data matrix $A_{2*2}$ form a completed data block, and the sub-data block 1 in the second row and the sub-data block 2 in the first row that are of the data matrix $A_{2*2}$ form a completed data block. The sub-data block 1 in the first row of the data matrix $A_{2*2}$ may be arranged inverse to the sub-data block 1 in the second row, and the sub-data block 2 in the first row of the data matrix $A_{2*2}$ may be arranged inverse to the sub-data block 2 in the second row. Sizes of sub-data blocks in each row may be different.

A data matrix A includes a network packet, as shown in FIG. 13B, where an order of transmitting a network packet on a first path corresponding to a first row is $Order_1$=[1, 2, 3, 4, 5, 6, 7, 8]. An order of transmitting a network packet on a second path corresponding to a second row is $Order_2$=[8, 7, 6, 2, 1, 3, 4, 5], and an order of transmitting a network packet on a third path corresponding to a third row is $Order_3$=[5, 4, 3, 7, 6, 8, 2, 1].

In this embodiment of this application, orders of network packets in sub-data blocks in different rows of the matrix $A_{M*M}$ may be the same or may be different. In other words, orders of network packets in sub-data blocks transmitted on different paths may be the same or may be different.

Finally, after determining the transmission order of the network packets on different paths, the client may allocate the network packets to different paths based on the order.

It should be noted that network packets in any sub-data block may be discontinuous. For example, the sub-data 1 may be [network packet 1, network packet 2], or may be [network packet 1, network packet 8].

Second, a method in which the client determines a transmission order of network packets on different paths by determining that the network packets are allocated to different paths includes:

First, the client and the service end determine, based on the protocol stack capability, that a quantity of paths that can be used for data transmission is M.

Second, the client sequentially allocates the network packets to different paths based on the order of obtaining the network packets by encapsulating the network packets by the service end.

Third, the client may repeatedly allocate the encapsulated network packet for K times, where K is an integer less than M and greater than or equal to 0. The K times of repeated allocation need to ensure that network packets on any path are not repeated.

Figure 14A:
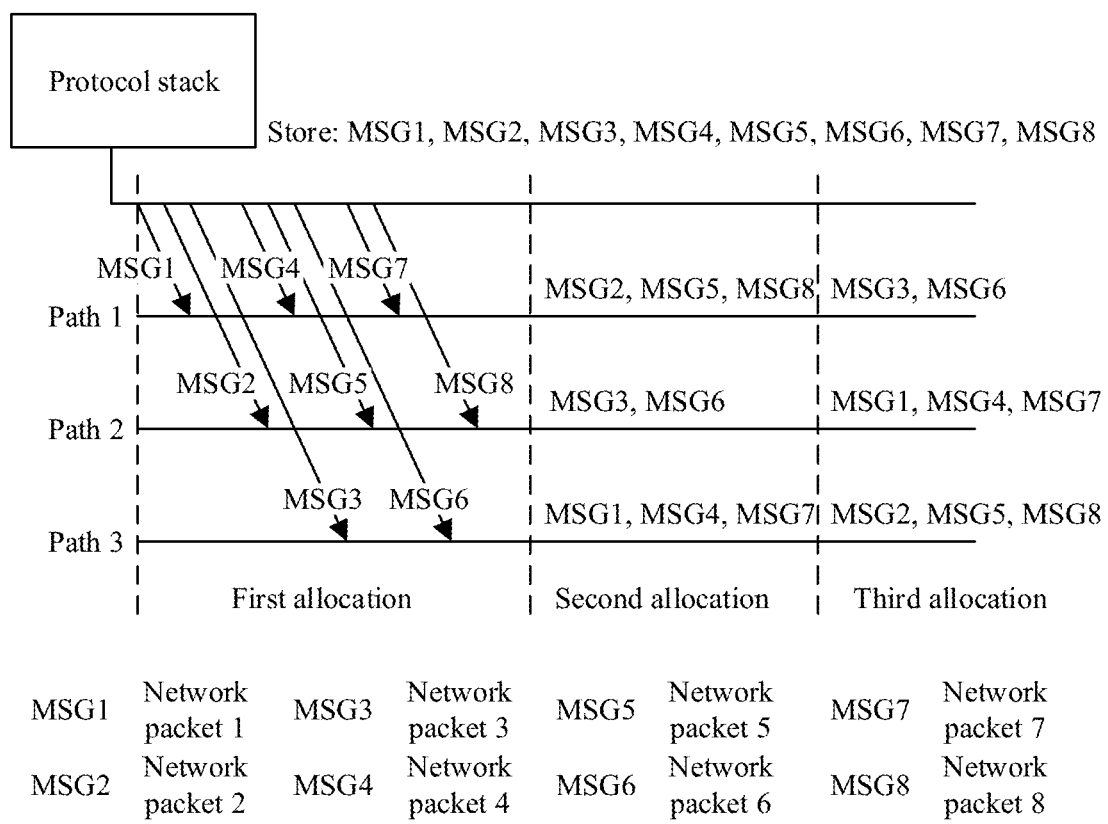
FIG. 14A and FIG. 14B are schematic diagrams of an example of a network packet allocation manner according to an embodiment of this application.
Figure 14B:
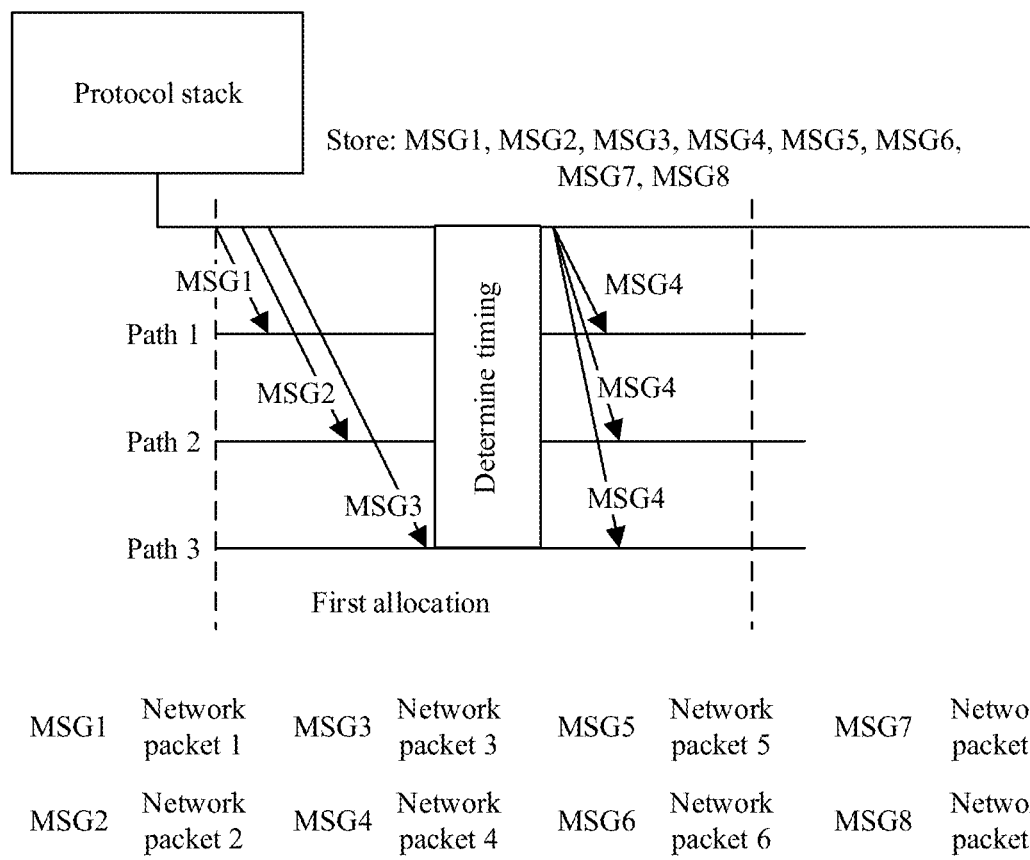

FIG. 14A and FIG. 14B are schematic diagrams of an example of a network packet allocation manner according to an embodiment of this application.

As shown in FIG. 14A, when allocating the network packets for the first time, the client sequentially allocates the network packets in a staggered manner. When the client allocates the network packets for a $U^{th}$ time, because the buffer of the client protocol stack stores a plurality of network packets, the network packets may be directly allocated to each path without waiting. U is an integer greater than 1 and less than or equal to M. For example, during the first allocation, after the protocol stack encapsulates to obtain the network packet 1, the protocol stack may immediately allocate the network packet 1 to the path 1 for transmission without waiting for encapsulation of the network packet 2. After the protocol stack encapsulates to obtain the network packet 2, the protocol stack may immediately allocate the network packet 2 to the path 2 for transmission without waiting for encapsulation of the network packet 3.

For example, when M=3, after the client allocates the network packets for the first time, a transmission order of the network packets on the path 1 is $Order_1$=[1, 4, 7, 2, 5, 8, 3, 6], a transmission order of the network packets on the path 2 is $Order_1$=[2, 5, 8, 3, 6, 1, 4, 7], and a transmission order of the network packets on the path 3 is $Order_1$=[3, 6, 1, 4, 5, 7, 2, 5, 8].

It should be noted that, if the M paths between the client and the service end transmit the network packets at a same rate, the client does not need to repeatedly allocate the network packets after allocating the network packets for the first time. In addition, considering that at least one path can successfully transmit data from the client to the service end, after the client allocates the network packets for the first time, the client allocates the network packets for a maximum of M−1 times, so that all network packets are transmitted on any path. In this way, data can be transmitted to the service end.

As shown in FIG. 14B, when allocating an $(M+1)^{th}$ network packet in the network packet allocation for the first time, the client may determine whether data in corresponding buffers of all paths has been sent out. If network packets on a path are sent, the network packets may be preferentially allocated to the path.

For example, after allocating the network packet 1, the network packet 2, and the network packet 3, and before allocating the network packet 4, the client may determine whether data on the path 1, the path 2, and the path 3 has been sent. When the network packet 2 has been sent, the client allocates the network packet 4 to the path 2 for transmission. When the network packet 1 has been sent, the client allocates the network packet 4 to the path 1 for transmission. When the network packet 3 has been sent, the client allocates the network packet 4 to the path 3 for transmission.

S1103: After receiving complete data, the service end sends an acknowledgment packet to the client, and after receiving the acknowledgment packet, the client clears the network packets to be sent.

Specifically, after receiving a plurality of network packets, the service end may send an acknowledgment packet to the client. The acknowledgment packet is used to notify the client that all network packets corresponding to one data block have been received, or the acknowledgment packet is used to notify the client of which packets are received. After receiving the acknowledgment packet, the client discards all network packets corresponding to the acknowledgment packet, so as to avoid redundant sending, thereby reducing occupation of network bandwidth.

Obviously, in this case, a network packet sent by the client is not the same as an actually transmitted network packet. In the following, a sending order is used to indicate a sequence of network packets to be sent by the client, and a transmission order is used to indicate an order of actually sending network packets by the client.

It should be noted that, for the TCP protocol and the upper layer protocol based on the TCP protocol, after receiving a network packet, the service end sends an acknowledgment packet to the client to notify the client that the network packet has been received. To implement the multipath aggregation scheduling method provided in this embodiment of this application, a field in the acknowledgment packet may be modified, so that the acknowledgment packet can simultaneously acknowledge a single network packet and acknowledge one data block.

When the protocol stack of the service end cannot reply to the acknowledgment packet to instruct the client to clear the to-be-sent network packet, the client may choose to reduce redundancy to send the network packet.

Before transmitting the network packet to the service end, the client may ask the service end whether the service end has the capability of replying the acknowledgment packet. If the server does not have the capability of replying the acknowledgment packet, redundant sending of the network packet can be reduced. The client reduces redundancy to send network packets, including: When there are M paths between the client and the service end, the client actually sends network packets in an M−1 times of redundancy, so that a quantity of network packets transmitted on each path can be reduced evenly or non-evenly, thereby reducing redundant sending.

For example, there are four paths between the client and the service end, and to-be-sent network packets are the network packet 1 to the network packet 8. Orders of sending network packets on different paths are $Order_1$=[1, 2, 3, 4, 5, 6, 7, 8], $Order_2$=[8, 7, 6, 5, 4, 3, 2, 1], $Order_3$=[3, 4, 7, 8, 1, 2, 5, 6], and $Order_4$=[5, 6, 1, 2, 7, 8, 3, 4]. After redundant sending is reduced, network packets are transmitted in the following sequence on different paths: $Order_1$=[1, 2, 3, 4], $Order_2$=[8, 7, 6, 5], $Order_3$=[3, 4, 7, 8], and $Order_4$=[5, 6, 1, 2]. In this case, the client reduces the quantity of packets transmitted on each path from three-time redundancy sending to one-time redundancy sending.

In some embodiments of this application, when the protocol stack of the service end cannot reply to the acknowledgment packet to instruct the client to clear the to-be-sent network packet, the client may reduce redundancy to send the network packet.

It may be understood that, the client may reduce a redundancy amount of transmitted network packets by reducing redundancy sending.

In some embodiments of this application, when the protocol stack of the service end can restore the acknowledgment packet to notify the client of packets that have been received, the client may not send the network packets that have been received by the service end.

Figure 15A:
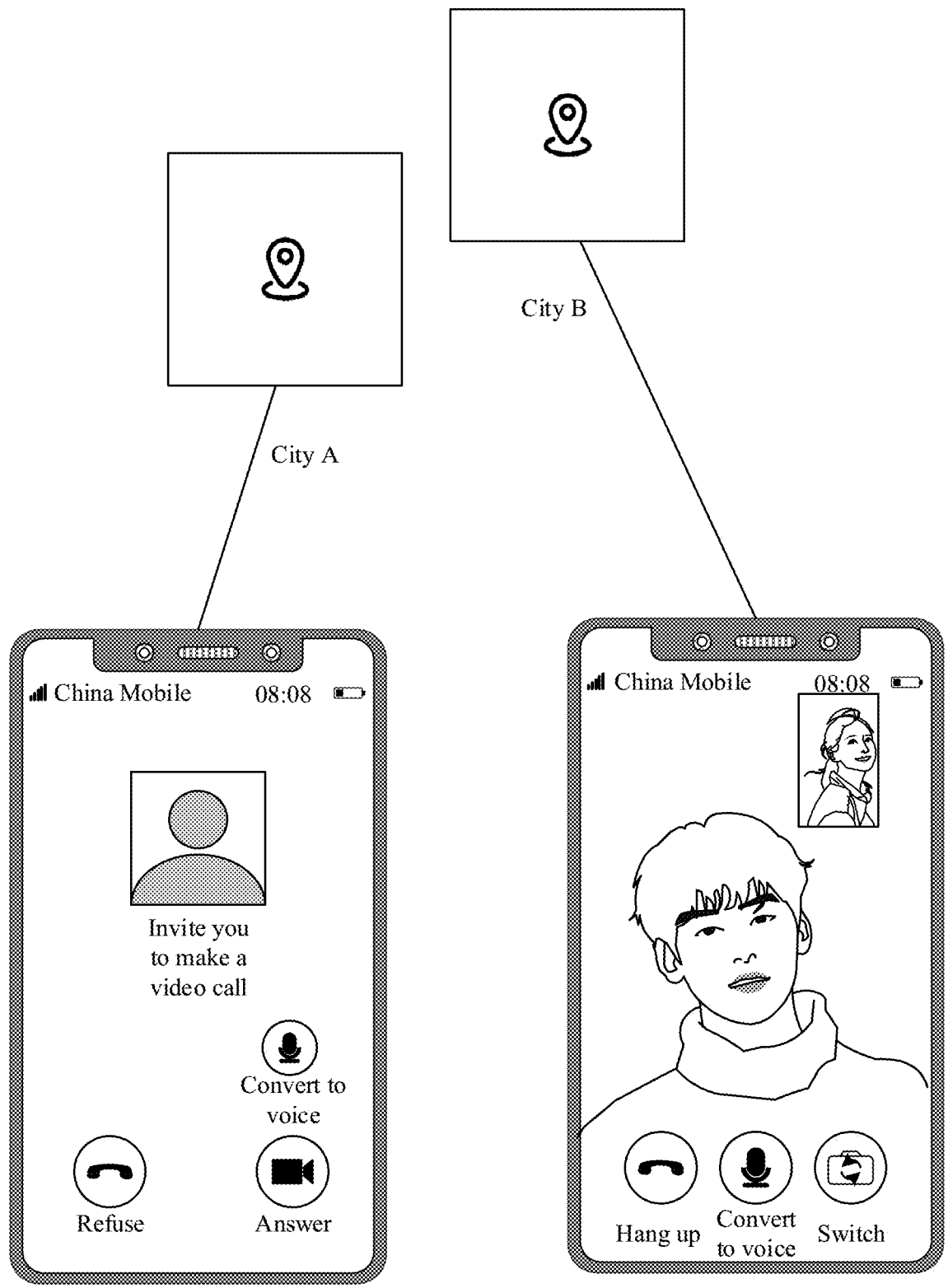
FIG. 15A is a schematic diagram of an example in which a multipath aggregation scheduling method is implemented in a far-field scenario according to an embodiment of this application.
Figure 15B:
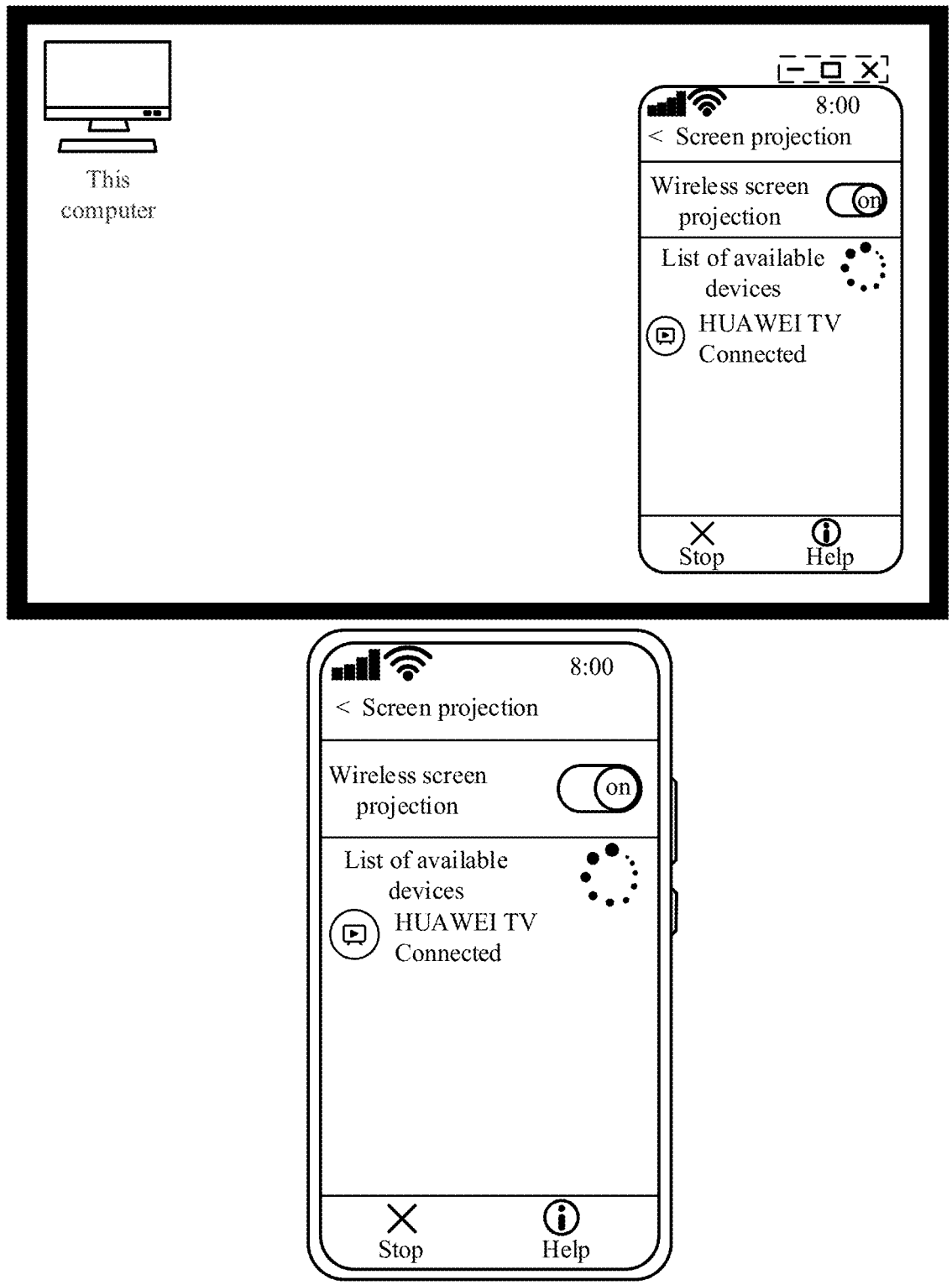
FIG. 15B is a schematic diagram of an example in which a multipath aggregation scheduling method is implemented in a near-field scenario according to an embodiment of this application.

Again, the following uses content shown in FIG. 15A and FIG. 15B as an example to describe examples of implementations of the multipath aggregation scheduling method provided in this application in different scenarios.

First, an implementation of the multipath aggregation scheduling method provided in this embodiment of this application in a far-field scenario is described.

FIG. 15A is a schematic diagram of an example in which a multipath aggregation scheduling method is implemented in a far-field scenario according to an embodiment of this application.

As shown in FIG. 15A, when a user performs a video call thousands of miles apart, the multipath aggregation scheduling method provided in this embodiment of this application may be used to reduce a delay of the video call, improve smoothness of the video call, thereby improving user experience.

There are at least two available paths between a mobile phone B and a mobile phone A. A first path is a path corresponding to Wi-Fi of a router, which is referred to as a path 1. A second path is a path corresponding to a cellular mobile communication function, which is referred to as a path 2.

The mobile phone B is used as an example. When the mobile phone B is used as a client to send data, the mobile phone B obtains data of continuous frame images by using a camera. For example, the mobile phone B obtains data of 60 frame images per second. In this case, data of one frame image needs to be transmitted from the mobile phone B to the mobile phone A every 16 ms. It may be considered that a plurality of network packets corresponding to data of one frame image form one data block. For example, data of one frame image corresponds to eight network packets.

In this case, according to the multipath aggregation scheduling method provided in this embodiment of this application, a sending order of network packets allocated by the client on different paths may be as follows: $Order_1$=[1, 2, 3, 4, 5, 6, 7, 8], $Order_2$=[8, 7, 6, 5, 4, 3, 2, 1]; $Order_1$=[1,3,5, 7,8,6,4,2], $Order_2$=[2,4,6,8,7,5,3,1]; $Order_1$=[1,4,7,2,5,8,3, 6], $Order_2$=[6,3,8,5,2,4,7,1]; $Order_1$=[1,5,2,6,3,7,4,8], $Order_2$=[8,4,7,3,6,2,5,1]; $Order_1$=[1,6,2,7,3,8,4,5], $Order_2$= [5,4,8,3,7,2,6,1] $Order_1$=[1,7,2,8,3,4,5,6], $Order_2$=[6,5,4,3, 8,2,7,1].

In this case, when the multipath aggregation scheduling method provided in this embodiment of this application is implemented, because the service end returns an acknowledgment packet to instruct the client to clear an unsent network packet, a transmission order of network packets on different paths may be: $Order_1$=[1], $Order_2$=[8,7,6,5,4,3,2, 1]; $Order_1$=[1,2], $Order_2$=[8,7,6,5,4,3]; $Order_1$=[1,2,3], $Order_2$=[8,7,6,5,4]; $Order_1$=[1,2,3,4], $Order_2$=[8,7,6,5]; $Order_1$=[1,2,3,4,5], $Order_2$=[8,7,6]; $Order_1$=[1,2,3,4,5,6], $Order_2$=[8,7]; $Order_1$=[1,2,3,4,5,6,7], $Order_2$=[8]; $Order_1$= [1], $Order_2$=[2,4,6,8,7,5,3].

For an order in which the client allocates network packets on different paths and an order in which an actual network packet is transmitted on a path, refer to text descriptions in FIG. 9B, FIG. 12A, FIG. 12B, and FIG. 14A. Details are not described herein again.

Second, an implementation of a multipath aggregation scheduling method provided in this embodiment of this application in a near-field scenario is described.

FIG. 15B is a schematic diagram of an example in which a multipath aggregation scheduling method is implemented in a near-field scenario according to an embodiment of this application.

As shown in FIG. 15B, in a near-field scenario such as a P2P scenario, the mobile phone projects content displayed on a screen to a television. The mobile phone establishes a connection to the television through a Wi-Fi function provided by the router. If the mobile phone and the television have a dual Wi-Fi capability of a 2.4 GHz frequency band+a 5 GHz frequency band, or have a dual Wi-Fi capability of a 5 GHz frequency band+a 5 GHz frequency band, there are a plurality of paths that can be used for transmission between the mobile phone and the television.

In this case, the client may implement the multipath aggregation scheduling method provided in this embodiment of this application, so that the network packets are transmitted on different paths.

Finally, an electronic device provided in embodiments of this application is described. The electronic device may be the service end in embodiments of this application, or may be the client in embodiments of this application.

Figure 16:
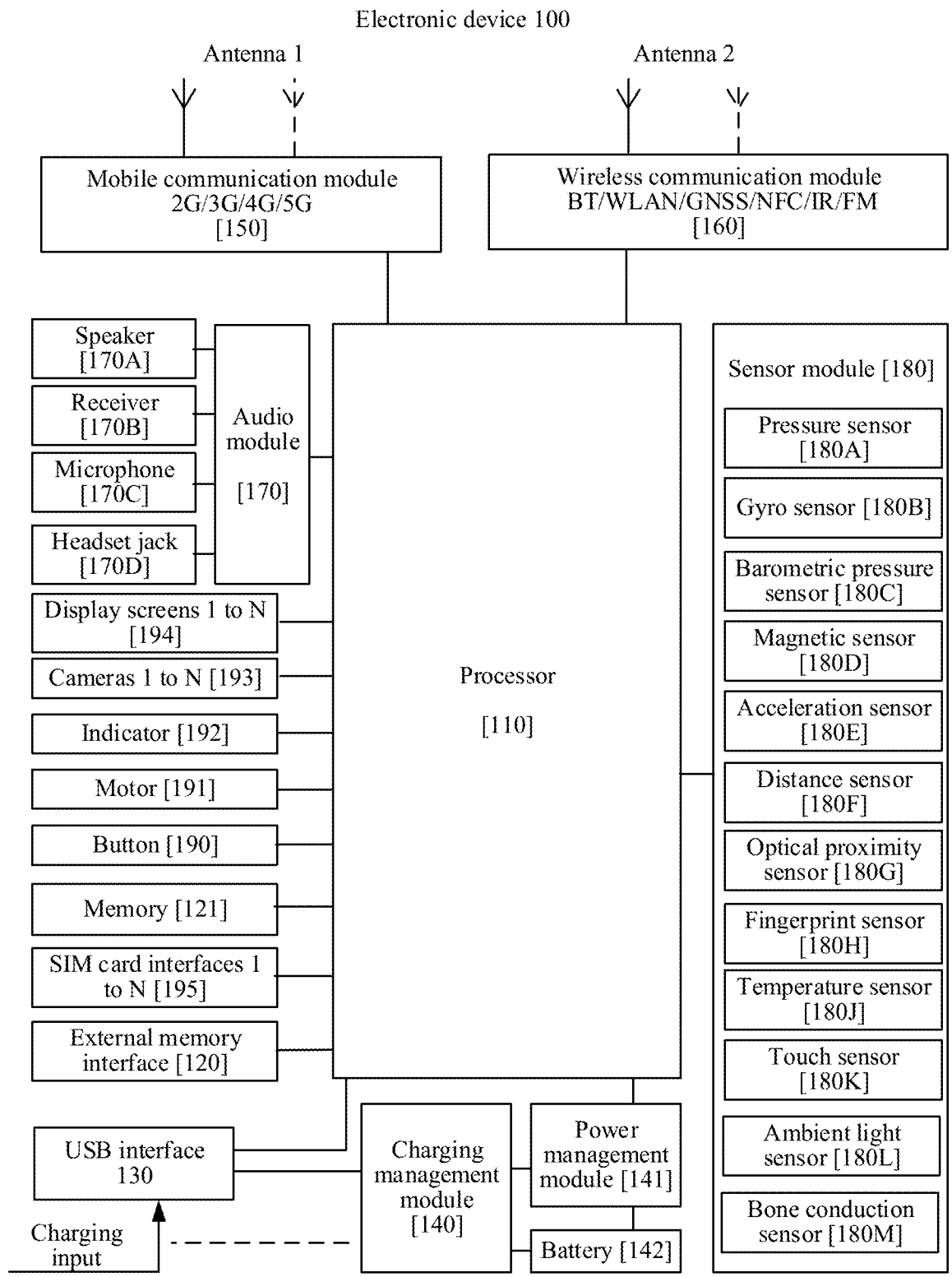
FIG. 16 is a hardware structural block diagram of an example of an electronic device according to an embodiment of this application.

FIG. 16 is a hardware structural block diagram of an example of an electronic device according to an embodiment of this application.

The electronic device 100 may be a mobile phone, a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (augmented reality, AR) device, a virtual reality (virtual reality, VR) device, an artificial intelligence (artificial intelligence, AI) device, a wearable device, a vehicle-mounted device, a smart home device, and/or a smart city device. A specific type of the electronic device is not specially limited in this embodiment of this application.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display screen 194, a subscriber identity module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, and a touch sensor 180K, an ambient light sensor 180L, a bone conduction sensor 180M, and the like.

It may be understood that the structure shown in this embodiment of the present invention does not constitute a specific limitation on the electronic device 100. In some other embodiments of this application, the electronic device 100 may include more or fewer components than those shown in the figure, or some components may be combined, or some components may be split, or components are arranged in different manners. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU), etc. Different processing units may be independent components, or may be integrated into one or more processors.

The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access, reduces a waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, and/or a universal serial bus (universal serial bus, USB) interface.

The I2C interface is a two-way synchronization serial bus, and includes a serial data line (serial data line, SDA) and a serial clock line (derail clock line, SCL). The I2S interface may be used for audio communication. The PCM interface may further be used for audio communication, and sampling, quantization, and encoding of an analog signal. The UART interface is a universal serial data bus used for asynchronous communication. The bus may be a two-way communication bus. The MIPI interface may be configured to connect the processor 110 to a peripheral device such as the display screen 194 and the camera 193. The GPIO interface may be configured through software. The USB interface 130 is an interface conforming to a USB standard specification, and may be specifically a Mini USB interface, a Micro USB interface, a USB Type-C interface, or the like.

It may be understood that an interface connection relationship between the modules that is shown in this embodiment of the present invention is merely an example for description, and does not constitute a limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from a charger. The power management module 141 is configured to connect to the battery 142, the charging management module 140, and the processor 110.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be further reused, to improve antenna utilization. For example, the antenna 1 may be reused as a diversity antenna of a wireless local area network. In some other embodiments, an antenna may be used in combination with a tuning switch.

The mobile communication module 150 may provide a solution to wireless communication such as 2G/3G/4G/5G applied to the electronic device 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 and at least some modules of the processor 110 may be disposed in a same device.

The modem processor may include a modulator and a demodulator. The modulator is configured to modulate a to-be-sent low-frequency baseband signal into a medium- and high-frequency signal. The demodulator is configured to demodulate a received electromagnetic wave signal into a low-frequency baseband signal. Next, the demodulator transmits the demodulated low-frequency baseband signal to the baseband processor for processing. The low-frequency baseband signal is processed by the baseband processor and then transmitted to an application processor. The AP outputs a sound signal through an audio device (which is not limited to the speaker 170A, the phone receiver 170B, and the like), or displays an image or a video through the display screen 194. In some embodiments, the modem processor may be an independent device. In some other embodiments, the modem processor may be independent of the processor 110, and is disposed in a same device as the mobile communication module 150 or another functional module.

The wireless communication module 160 may provide a solution for wireless communication including a wireless local area network (wireless local area network, WLAN) (such as a wireless fidelity (wireless fidelity, Wi-Fi) network), Bluetooth (Bluetooth, BT), and a global navigation satellite system (global navigation satellite system, GNSS), frequency modulation (frequency modulation, FM), a near field communication (near field communication, NFC) technology, an infrared (infrared, IR) technology, and the like to be applied to the electronic device 100. The wireless communication module 160 may be one or more devices integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, and perform frequency modulation and amplification on the signal. The amplified signal is converted into an electromagnetic wave and radiated out via the antenna 2.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 100 implements a display function by using the GPU, the display screen 194, the AP, and the like. The GPU is a microprocessor for image processing, and is connected to the display screen 194 and the application processor. The GPU is configured to: perform mathematical and geometric computation, and render an image. The processor 110 may include one or more GPUs and execute program instructions to generate or change display information.

The display screen 194 is configured to display an image, a video, and the like. In some embodiments, the electronic device 100 may include 1 or N display screens 194, and N is a positive integer greater than 1.

The electronic device 100 may implement a photographing function by using the ISP, the camera 193, the video codec, the GPU, the display screen 194, the AP, and the like. The ISP is used to process data fed back by the camera 193.

The camera 193 is configured to capture a static image or a video. In some embodiments, the electronic device 100 may include one or N cameras 193, and N is a positive integer greater than 1.

The digital signal processor is configured to process a digital signal, and in addition to a digital image signal, may further process another digital signal. For example, when the electronic device 100 performs frequency selection, the digital signal processor is configured to perform Fourier transform and the like on frequency energy.

The video codec is configured to compress or decompress a digital video.

The NPU is a neural-network (neural-network, NN) computation processor. The NPU quickly processes input information by referring to a structure of a biological neural network, for example, by referring to a mode of transmission between human brain neurons, and continuously performs self-learning.

The internal memory 121 may include one or more random access memories (random access memories, RAMs) and one or more non-volatile memories (non-volatile memories, NVMs).

The random access memory may include a static random access memory (static random access memory, SRAM), a dynamic random access memory (dynamic random access memory, DRAM), a synchronous dynamic random access memory (synchronous dynamic random access memory, SDRAM), a double data rate synchronous dynamic random access memory. (double data rate synchronous dynamic random access memory, DDR SDRAM, for example, a 5th generation DDR SDRAM is usually referred to as a DDR5 SDRAM), and the like.

The non-volatile memory may include a magnetic disk storage device and a flash memory (flash memory).

The flash memory may be divided into NOR FLASH, NAND FLASH, 3D NAND FLASH, and the like based on an operation principle, and may be divided into a single-level cell (single-level cell, SLC) and a multi-level cell (multi-level cell) based on a storage cell potential order, MLC), a third-level cell (triple-level cell, TLC), a fourth-level cell (quad-level cell, QLC), and the like, which may include a universal flash storage (English: universal flash storage, UFS), an embedded multimedia memory card (embedded multimedia card, eMMC), and the like.

The random access memory may be directly read and written by the processor 110, and may be configured to store an executable program (for example, a machine instruction) of an operating system or another running program, or may be configured to store data of a user, an application, and the like.

The non-volatile memory may also store an executable program, data of a user, data of an application, and the like, which may be loaded into the random access memory in advance for directly reading and writing by the processor 110.

The external memory interface 120 may be configured to connect to an external non-volatile memory, to expand a storage capability of the electronic device 100. The external non-volatile memory communicates with the processor 110 by using the external memory interface 120, to implement a data storage function. For example, files such as music and videos are stored in the external non-volatile memory.

The electronic device 100 may implement an audio function by using an audio module 170, a speaker 170A, a phone receiver 170B, a microphone 170C, a headset jack 170D, an application processor, and the like, for example, implement a music playback function and a recording function.

The audio module 170 is configured to convert digital audio information into an analog audio signal output, and is further configured to convert an analog audio input into a digital audio signal. The speaker 170A, also referred to as a "loudspeaker", is configured to convert an audio electrical signal into a sound signal. The phone receiver 170B, also referred to as a "receiver", is configured to convert an audio electrical signal into a sound signal. The microphone 170C, also referred to as a "microphone" or a "microphone", is configured to convert a sound signal into an electrical signal. The headset jack 170D is configured to connect to a wired headset. The pressure sensor 180A is configured to sense a pressure signal, and may convert the pressure signal into an electrical signal. The gyro sensor 180B may be configured to determine a motion posture of the electronic device 100. The barometric pressure sensor 180C is configured to measure barometric pressure. The magnetic sensor 180D includes a Hall sensor. The acceleration sensor 180E may detect acceleration values of the electronic device 100 in all directions (generally in three axes). The distance sensor 180F is configured to measure a distance.

The optical proximity sensor 180G may include, for example, a light-emitting diode (LED) and an optical detector such as a photodiode. The ambient light sensor 180L is configured to sense luminance of ambient light. The fingerprint sensor 180H is configured to collect a fingerprint. The temperature sensor 180J is configured to detect a temperature. The touch sensor 180K is also referred to as a "touch device". The bone conduction sensor 180M may obtain a vibration signal.

The button 190 includes a power key, a volume key, and the like. The motor 191 may generate a vibration prompt.

The indicator 192 may be an indicator light, and may be configured to indicate a charging state or a battery change, or may be further configured to indicate a message, a missed call, a notification, or the like.

The SIM card interface 195 is configured to connect to a SIM card. The SIM card may be inserted into the SIM card interface 195 or plugged from the SIM card interface 195, to come into contact with or be separated from the electronic device 100. The electronic device 100 may support one or N SIM card interfaces. N is a positive integer greater than 1. The SIM card interface 195 can support a nano-SIM card, a micro-SIM card, a SIM card, and the like. A plurality of cards may all be inserted into the same SIM card interface 195. The plurality of cards may be of the same type or different types. The SIM card interface 195 may further be compatible with different types of SIM cards. The SIM card interface 195 may also be compatible with an external memory card. The electronic device 100 interacts with a network by using a SIM card, to implement functions such as a call and data communication. In some embodiments, the electronic device 100 uses an eSIM, that is, an embedded SIM card. The eSIM card may be embedded in the electronic device 100 and cannot be separated from the electronic device 100.

A software system of the electronic device 100 may use a layered architecture, an event-driven architecture, a micro-kernel architecture, a micro service architecture, or a cloud architecture. In the embodiments of the present invention, an Android system with a layered architecture is used as an example to illustrate a software structure of the electronic device 100.

Figure 17:
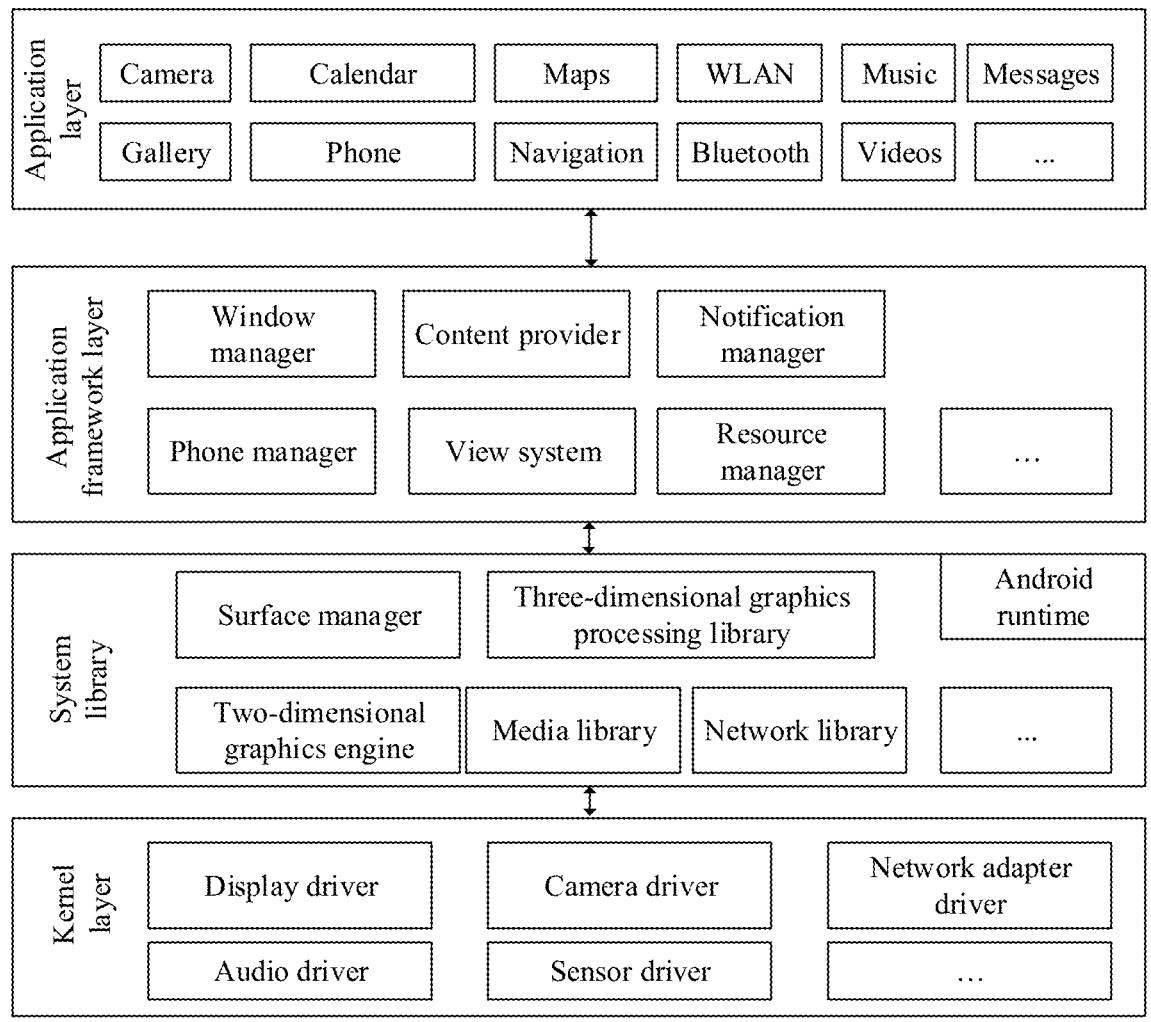
FIG. 17 is a software structural block diagram of an example of an electronic device 100 according to an embodiment of this application.

FIG. 17 is a software structural block diagram of an example of an electronic device 100 according to an embodiment of this application.

A layered architecture divides software into several layers, with each layer having a clear role and responsibilities. The layers communicate with each other through software interfaces. In some embodiments, an Android system is divided into four layers from top to bottom: an application layer; an application framework layer; an Android runtime (Android runtime) and a system library; and a kernel layer.

The application layer may include a series of application packages.

As shown in FIG. 17, the application packages may include applications such as Camera, Gallery, Calendar, Phone, Maps, Navigation, WLAN, Bluetooth, Music, Videos, and Messages.

The application framework layer provides an application programming interface (application programming interface, API) and a programming framework for the applications in the application layer. The application framework layer includes some predefined functions.

As shown in FIG. 17, the application framework layer may include a window manager, a content provider, a view system, a phone manager, a resource manager, a notification manager, and the like.

The window manager is configured to manage a windowing program. The window manager may obtain a size of a display screen, determine whether there is a status bar, perform screen locking, perform screen capturing, and so on.

The content provider is configured to store and retrieve data and make the data accessible to an application. The data may include a video, an image, audio, phone calls made and answered, a browsing history, favorites, a phone book, etc.

The view system includes a visual control, for example, a control for displaying text or a control for displaying a picture. The view system may be configured to build an application. A display interface may include one or more views. For example, a display interface including an SMS notification icon may include a view for displaying text and a view for displaying a picture.

The phone manager is configured to provide a communication function of the electronic device 100, for example, call state management (including getting through, hang-up, and the like).

The resource manager provides a variety of resources, such as localized character strings, icons, pictures, layout files, video files, and so on, for applications.

The notification manager enables an application to display a notification message in a status bar. The notification messages may be used to convey an informative message that may disappear automatically after a short period of time, and no user interaction is required. For example, the notification manager is used for informing completion of downloading, for message alerts, and so on. The notification manager may also provide, on a status bar at the top of the system, a notification in a form of a chart or scroll bar text, for example, a notification of an application running in the background, or provide, on a screen, a notification in a form of a dialog window. For example, text information is displayed in the status bar, a prompt tone is generated, an electronic device vibrates, and an indicator light blinks.

The Android Runtime includes a kernel library and a virtual machine. The Android runtime is responsible for scheduling and managing an Android system.

The kernel library includes two parts: one part being functional functions that java needs to call, and the other part being an Android kernel library.

The application layer and the application framework layer run in the virtual machine. The virtual machine executes java files of the application layer and the application framework layer as binary files. The virtual machine is configured to perform functions, such as object life cycle management, stack management, thread management, security and exception management, and garbage collection.

The system library may include a plurality of function modules, for example, a surface manager (surface manager), a media library (Media Library), a three-dimensional graphics processing library (such as an OpenGL ES), 2D graphics engine (such as an SGL), and the like.

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video encoding formats, such as MPEG4, H.264, MP3, AAC, AMR, JPG, and PNG.

The three-dimensional graphics processing library is configured to implement three-dimensional drawing, image rendering, compositing, and layer processing.

The 2D graphics engine is a drawing engine for 2D drawing.

The system may further include a network library. Any application at the application layer may invoke a method, a function, or an interface of the network library to implement the multipath aggregation scheduling method provided in embodiments of this application.

The kernel layer is a layer between hardware and software. The kernel layer includes at least a display driver, a camera driver, an audio driver, and a sensor driver. The kernel layer further includes a network adapter driver. An application invokes a method, a function, and an interface of a network library, so that the network adapter driver allocates network packets on different paths according to the multipath aggregation scheduling method provided in embodiments of this application, thereby improving a data transmission rate.

Figure 18:
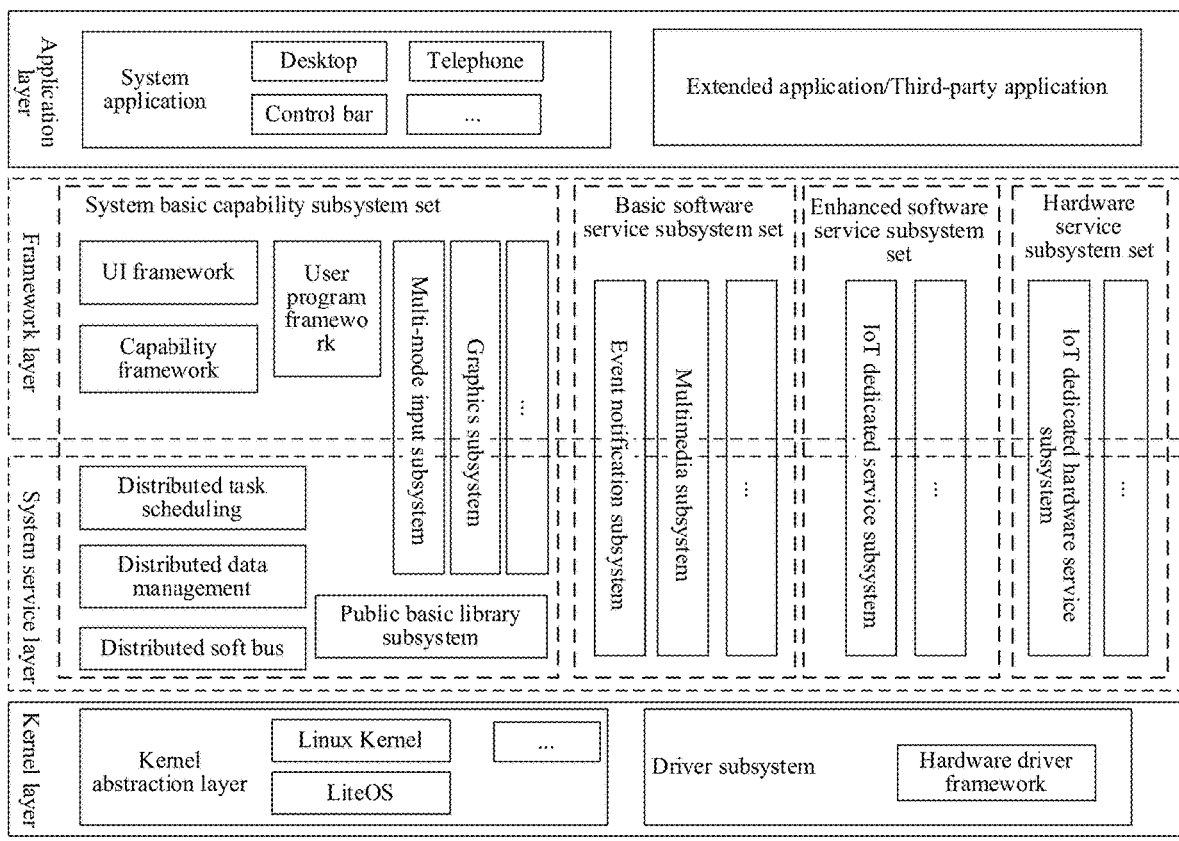
FIG. 18 is another software structural block diagram of an example of an electronic device 100 according to an embodiment of this application.

FIG. 18 is another software structural block diagram of an example of an electronic device 100 according to an embodiment of this application.

In some embodiments, the system is divided into four layers: an application layer, a framework layer, a system service layer, and a kernel layer from top to bottom.

The application layer includes a system application and a third-party non-system application.

The framework layer provides a multi-language user program framework and a capability framework such as JAVA, C, C++, and JS for an application at the application layer, and a multi-language framework API for various software and hardware services.

The system service layer includes: a system basic capability subsystem set, a basic software service subsystem set, an enhanced software service subsystem set, and a hardware service subsystem set.

The system basic capability subsystem set supports operations such as operating system running, scheduling, and migration on a plurality of devices. The system basic capability subsystem set may include: a distributed soft bus, distributed data management, distributed task scheduling, and a common basic subsystem. The system service layer and a framework layer jointly realize a multi-mode input subsystem, a graphics subsystem, and the like. The multipath aggregation scheduling method provided in this application may be located in the distributed soft bus.

The basic software service subsystem set provides common and general software services for the operating system, which may include: an event notification subsystem, a multimedia subsystem, and the like.

The enhanced software service subsystem set provides differentiated software services for different devices, which may include: an IoT dedicated service subsystem.

The hardware service subsystem set provides hardware services for the operating system, which may include: an IoT dedicated hardware service subsystem.

It should be noted that, based on deployment environments of different device forms, the system basic capability subsystem set, the basic software service subsystem set, the enhanced software service subsystem set, and the hardware service subsystem set may be re-divided based on other function granularities.

The kernel layer includes a kernel abstraction layer and a driver subsystem. The kernel abstraction layer includes a plurality of kernels, and provides a basic kernel capability for an upper layer by shielding a multi-kernel difference, for example, thread/process management, memory management, a file system, and network management. The driver subsystem provides a unified peripheral access capability and a driver development and management framework for software developers.

When configuring a communication resource collaboration method provided in this application, the software developers may configure a related parameter in a distributed soft bus, a driver subsystem, an IoT dedicated service subsystem, or an IoT dedicated hardware service subsystem. Further, an application at the application layer may implement the communication resource collaboration method provided in this application.

It should be noted that, based on different operating systems and possible future upgrades, the software structure of the electronic device may be divided in another manner based on the operating system.

According to the context, the term "when" used in the foregoing embodiments may be interpreted as a meaning of "if", "after", "in response to determining", or "in response to detecting". Similarly, according to the context, the phrase "when it is determined that" or "if (a stated condition or event) is detected" may be interpreted as a meaning of "if it is determined that" or "in response to determining" or "when (a stated condition or event) is detected" or "in response to detecting (a stated condition or event)".

All or a part of the foregoing embodiments may be implemented by software, hardware, firmware, or any combination thereof. When software is used to implement the embodiments, all or a part of the embodiments may be implemented in a form of a computer program product. The computer program product includes one or more computer instructions. When the program instruction of the computer is loaded and executed on the computer, all or some of the steps are generated according to the process or function described in the embodiments of this application. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, DVD), a semiconductor medium (for example, a solid-state drive), or the like.

A person of ordinary skill in the art may understand that all or a part of the processes of the methods in the foregoing embodiments may be implemented by a computer program instructing related hardware. The program may be stored in a computer-readable storage medium. When the program is executed, the processes of the methods in the foregoing embodiments are performed. The foregoing storage medium includes: any medium that can store program code, such as a ROM, a random access memory RAM, a magnetic disk, or an optical disc.

What is claimed is:

1. A multipath aggregation scheduling method, comprising:
    determining that there are N paths between a client and a service end, wherein the N paths comprise a first path and a second path, and N is an integer greater than or equal to 2;
    sending, by the client, M network packets on the first path in a first order, wherein M is an integer greater than or equal to 2;
    sending, by the client, the M network packets on the second path in a second order, wherein the first order is different from the second order; and
    deleting, by the client, the M network packets and stopping sending the M network packets after the client receives an acknowledgment packet.

2. The method according to claim 1, the method further comprising:
    determining that the N paths further comprise a third path; and
    sending, by the client, the M network packets on the third path in a third order, wherein the third order is different from both the first order and the second order.

3. The method according to claim 1, wherein a distance between the first order and the second order is the largest distance among distances between any two orders of the M network packets.

4. The method according to claim 1, wherein a cross-correlation between the first order and the second order is the smallest cross-correlation among cross-correlations between any two orders of the M network packets.

5. The method according to claim 2, wherein a sum of distances between every two of the first order, the second order, and the third order is the largest sum among sums of distances between every two of three orders of the M network packets.

6. The method according to claim 2, wherein a sum of cross-correlations between every two of the first order, the second order, and the third order is the smallest sum among sums of cross-correlations between every two of three orders of the M network packets.

7. The method according to claim 1, wherein the M network packets form a data block configured to implement a specific function.

8. The method according to claim 1, wherein the client does not send and duplicate the M network packets.

9. An electronic device, comprising:
one or more processors; and
a memory coupled to the one or more processors, the memory being configured to store computer program code comprising computer instructions that, when executed by the one or more processors cause the electronic device to:
determine that there are N paths between an electronic device and a service end, wherein the N paths comprise a first path and a second path, and N is an integer greater than or equal to 2;
send M network packets on the first path in a first order, wherein M is an integer greater than or equal to 2;
send the M network packets on the second path in a second order, wherein the first order is different from the second order; and
delete the M network packets and stop sending the M network packets after the client receives an acknowledgment packet.

10. The electronic device according to claim 9, wherein execution of the computer instructions by the one or more processors further cause the electronic device is further enabled to:
determine that the N paths further comprise a third path; and
send the M network packets on the third path in a third order, wherein the third order is different from each of the first order and the second order.

11. The electronic device according to claim 9, wherein a distance between the first order and the second order is the largest distance among distances between any two orders of the M network packets.

12. The electronic device according to claim 9, wherein a cross-correlation between the first order and the second order is the smallest cross-correlation among cross-correlations between any two orders of the M network packets.

13. The electronic device according to claim 10, wherein a sum of distances between every two of the first order, the second order, and the third order is the largest sum among sums of distances between every two of three orders of the M network packets.

14. The electronic device according to claim 10, wherein a sum of cross-correlations between every two of the first order, the second order, and the third order is the smallest sum among sums of cross-correlations between every two of three orders of the M network packets.

15. The electronic device according to claim 9, wherein the M network packets form a data block configured to implement a specific function.

16. The electronic device according to claim 9, wherein the client does not send and duplicate the M network packets.

* * * * *